US012710550B2

(12) United States Patent
Ratnaraj et al.

(10) Patent No.: US 12,710,550 B2
(45) Date of Patent: Aug. 18, 2026

(54) ERROR RECOVERY FOR A GNSS

(71) Applicant: QUALCOMM Incorporated, San Diego, CA (US)

(72) Inventors: Lohitha Ratnaraj, Pleasanton, CA (US); Sumit Bhattacharya, Carlsbad, CA (US); Jeffrey Wong, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/336,665

(22) Filed: Jun. 16, 2023

(65) Prior Publication Data

US 2024/0418868 A1 Dec. 19, 2024

(51) Int. Cl.
*G01S 19/39* (2010.01)
*G01S 19/25* (2010.01)

(52) U.S. Cl.
CPC ............ *G01S 19/396* (2019.08); *G01S 19/25* (2013.01)

(58) Field of Classification Search
CPC ....... G01S 19/396; G01S 19/25; H04W 64/00
See application file for complete search history.

(56) References Cited

U.S. PATENT DOCUMENTS

| | | | | |
|---|---|---|---|---|
| 6,871,061 | B1 * | 3/2005 | Koorapaty | G01S 5/10 455/517 |
| 2014/0365117 | A1 * | 12/2014 | Okamura | G01C 21/188 701/469 |
| 2015/0268351 | A1 * | 9/2015 | Toda | G01S 19/34 455/456.1 |
| 2017/0269231 | A1 * | 9/2017 | Dai | G01S 19/32 |
| 2020/0326190 | A1 * | 10/2020 | Miyao | G01C 21/28 |
| 2021/0048537 | A1 * | 2/2021 | Marmet | G01S 19/243 |
| 2021/0263165 | A1 * | 8/2021 | Zheng | G01S 19/43 |
| 2021/0278548 | A1 * | 9/2021 | Berntorp | G01S 19/44 |
| 2021/0333410 | A1 * | 10/2021 | Gum | G01S 19/215 |
| 2024/0069214 | A1 * | 2/2024 | Davidson | G01S 19/485 |
| 2025/0024423 | A1 * | 1/2025 | Dahlgren | G01S 13/88 |

* cited by examiner

*Primary Examiner* — William Kelleher
*Assistant Examiner* — Kenneth W Good
(74) *Attorney, Agent, or Firm* — Procopio, Cory, Hargreaves & Savitch LLP

(57) ABSTRACT

A method of wireless communication at a UE is disclosed herein. The method includes obtaining an indication of an occurrence of a GNSS error. The method includes storing, in memory and based on the indication, first position information for the UE that was obtained prior to the obtainment of the indication. The method includes obtaining, subsequent to an error recovery process, second position information for the UE. The method includes accepting or rejecting the second position information based on a comparison of the first position information, the second position information, and a set of conditions for the first position information and the second position information.

30 Claims, 14 Drawing Sheets

One Frame (TDD)
10 ms
200
subframe
RB
slot

D D D D D D D D D D D D F U
OFDM symbol
slot
subcarrier
DMRS R
CSI-RS
230
PDCCH CORESET
SSS
PSS
PDSCH
PBCH
REG 12 REs
1 CCE = 6 REGs
SS/PBCH Block BWP
BWP
20 RBs
channel bandwidth RBs
One Frame (TDD)
10 ms
250
subframe
RB
slot U U U U U U U U U U U U U U
OFDM symbol
slot
SRS
subcarrier
SRS Comb 0
SRS Comb 1
DMRS R
280
PUCCH
PUSCH

700

ERROR RECOVERY FOR A GNSS

TECHNICAL FIELD

The present disclosure relates generally to communication systems, and more particularly, to positioning.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IOT)), and other requirements. 5G NR includes services associated with enhanced mobile broadband (eMBB), massive machine e communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus includes at least one memory; and at least one processor coupled to the at least one memory and, based at least in part on information stored in the at least one memory, the at least one processor, individually or in any combination, is configured to obtain an indication of an occurrence of a global navigation satellite system (GNSS) error; store, in memory and based on the indication, first position information for the UE that was obtained prior to the obtainment of the indication; obtain, subsequent to an error recovery process, second position information for the UE; and accept or reject the second position information based on a comparison of the first position information, the second position information, and a set of conditions for the first position information and the second position information.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
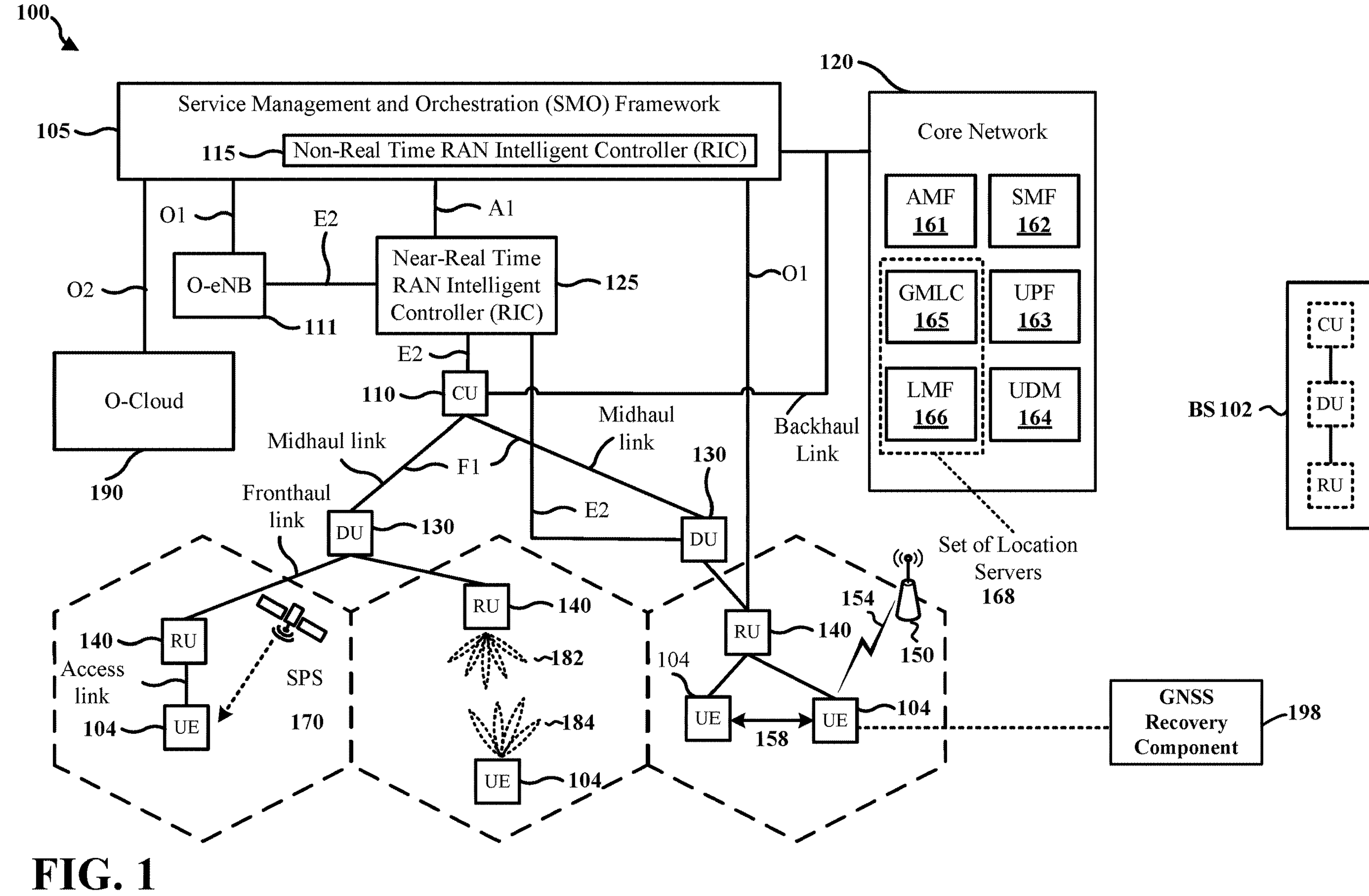
FIG. 1 is a diagram illustrating an example of a wireless communications system and an access network.

A UE may utilize a GNSS system in order to determine a position of the UE (i.e., produce/obtain a GNSS fix). For instance, the UE may perform measurements on signals transmitted by satellites(s) and the UE may compute its position based on the measurements. Furthermore, the UE may also utilize assistance information in addition to the measurements in order to determine the position of the UE in a more rapid manner, where the assistance information may be obtained/produced by the UE periodically and stored in memory of the UE. In an example, the assistance information (which may also be referred to as assistance data)

may include timing information of the UE, coarse position information of the UE, and satellite acquisition information. In some scenarios, a GNSS error may occur/be detected, where the GNSS error may be caused by the UE being unable to obtain a GNSS fix. Upon detecting the GNSS error, the UE may perform an error recovery process. As part of the error recovery process, the UE may delete the assistance information from the memory. The UE may then perform a blind search for satellite(s) without using assistance information in order to obtain a GNSS fix. After the UE has obtained the GNSS fix, the UE may obtain new assistance information. However, obtaining a GNSS fix without assistance information may take a relatively long amount of time and/or may take a relatively large amount of computational resources of the UE, which may affect user experience.

Various aspects relate generally to positioning. Some aspects more specifically relate to improving a time to produce a GNSS fix after an error recovery in a limited GNSS signal environment. In some examples, a UE obtains an indication of an occurrence of a global navigation satellite system (GNSS) error. The UE stores, in memory and based on the indication, first position information for the UE that was obtained prior to the obtainment of the indication. The UE obtains, subsequent to an error recovery process, second position information for the UE. The UE accepts or rejects the second position information based on a comparison of the first position information, the second position information, and a set of conditions for the first position information and the second position information.

Particular aspects of the subject matter described in this disclosure can be implemented to realize one or more of the following potential advantages. In some examples, by storing the first position information (i.e., most recent position information) in the memory (as opposed to deleting the first position information) and accepting the second position information based on the comparison of the first position information, the second position information, and the set of conditions, the UE may be able to obtain a GNSS fix in a more rapid manner compared to a UE that deletes all assistance information as part of an error recovery process. Furthermore, by the comparison of the first position information, the second position information, and the set of conditions, the UE may accept the second position information with a reasonable amount of certainty that the second position information is not erroneous. Thus, the aforementioned technologies may improve user experience and/or conserve computational resources of the UE.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor (s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (CNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUS)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140. Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105. The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHZ-7.125 GHZ) and FR2 (24.25 GHz-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR2-2 (52.6 GHZ-71 GHz), FR4 (71 GHZ-114.25 GHZ), and FR5 (114.25 GHZ-300 GHZ). Each of these higher frequency bands falls within the EHF band.

With the above aspects in mind, unless specifically stated otherwise, the term “sub-6 GHz” or the like if used herein may broadly represent frequencies that may be less than 6 GHZ, may be within FR1, or may include mid-band frequencies. Further, unless specifically stated otherwise, the term “millimeter wave” or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a GNSS recovery component 198 that may be configured to obtain an indication of an occurrence of a global navigation satellite system (GNSS) error; store, in memory and based on the indication, first position information for the UE that was obtained prior to the obtainment of the indication; obtain, subsequent to an error recovery process, second position information for the UE; and accept or reject the second position information based on a comparison of the first position information, the second position information, and a set of conditions for the first position information and the second position information.

Figures 2A, 2B, 2C, 2D:
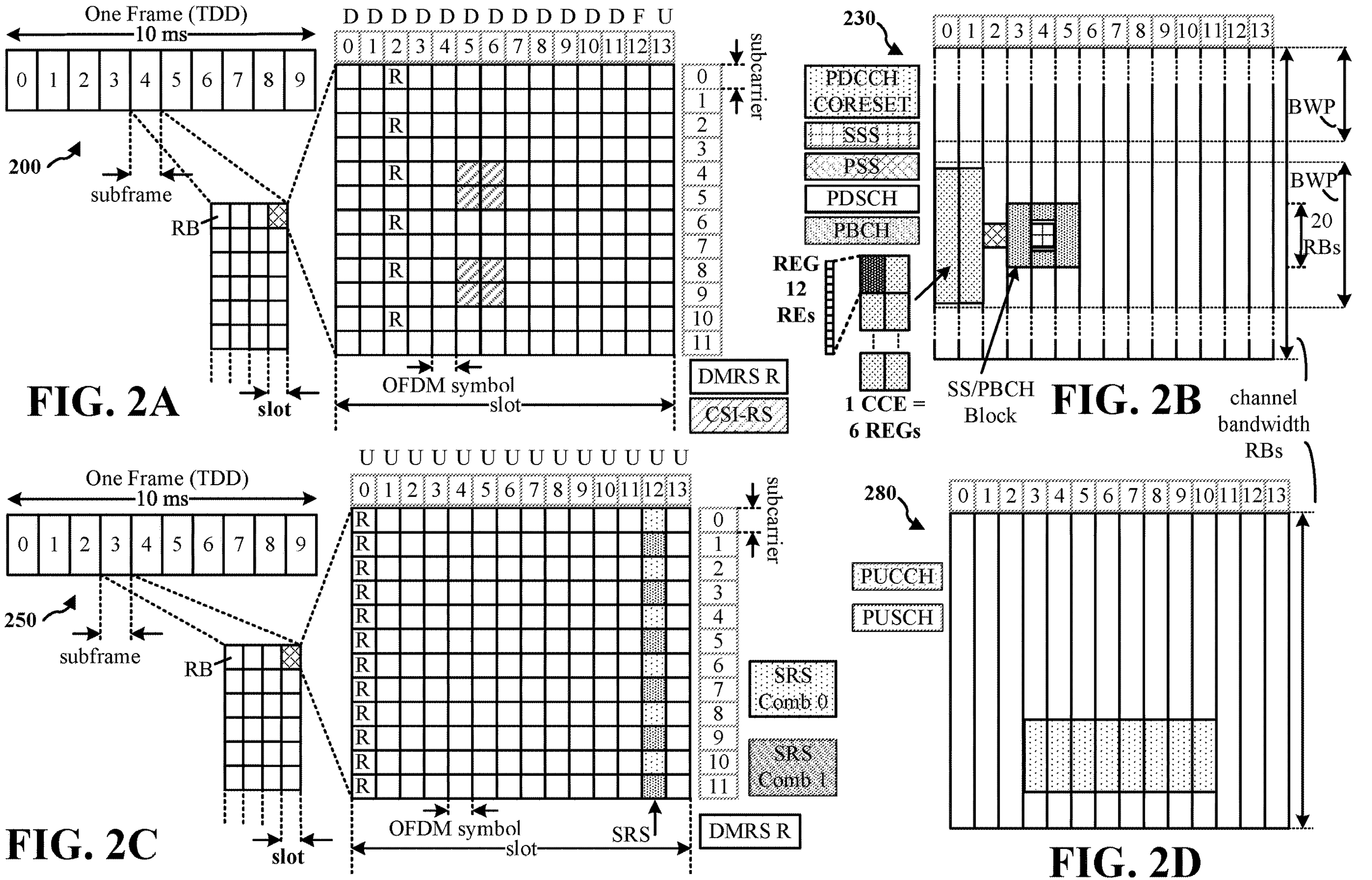
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| $\mu$ | SCS $\Delta f = 2^{\mu} \cdot 15$[kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^{\mu}$ slots/subframe. The subcarrier spacing may be equal to $2^{\mu}*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A, 2B, 2C, and 2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
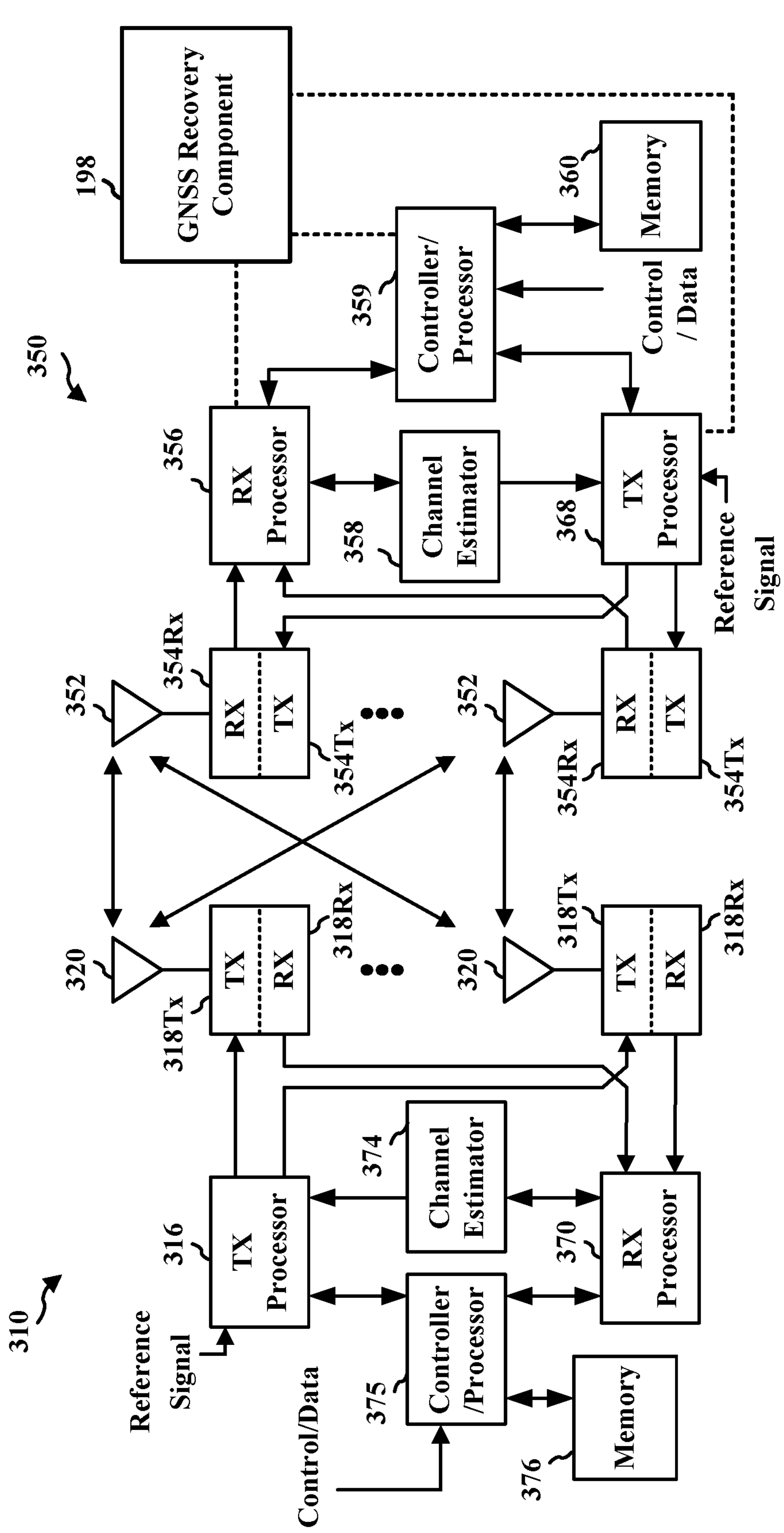
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the GNSS recovery component 198 of FIG. 1.

Figure 4:
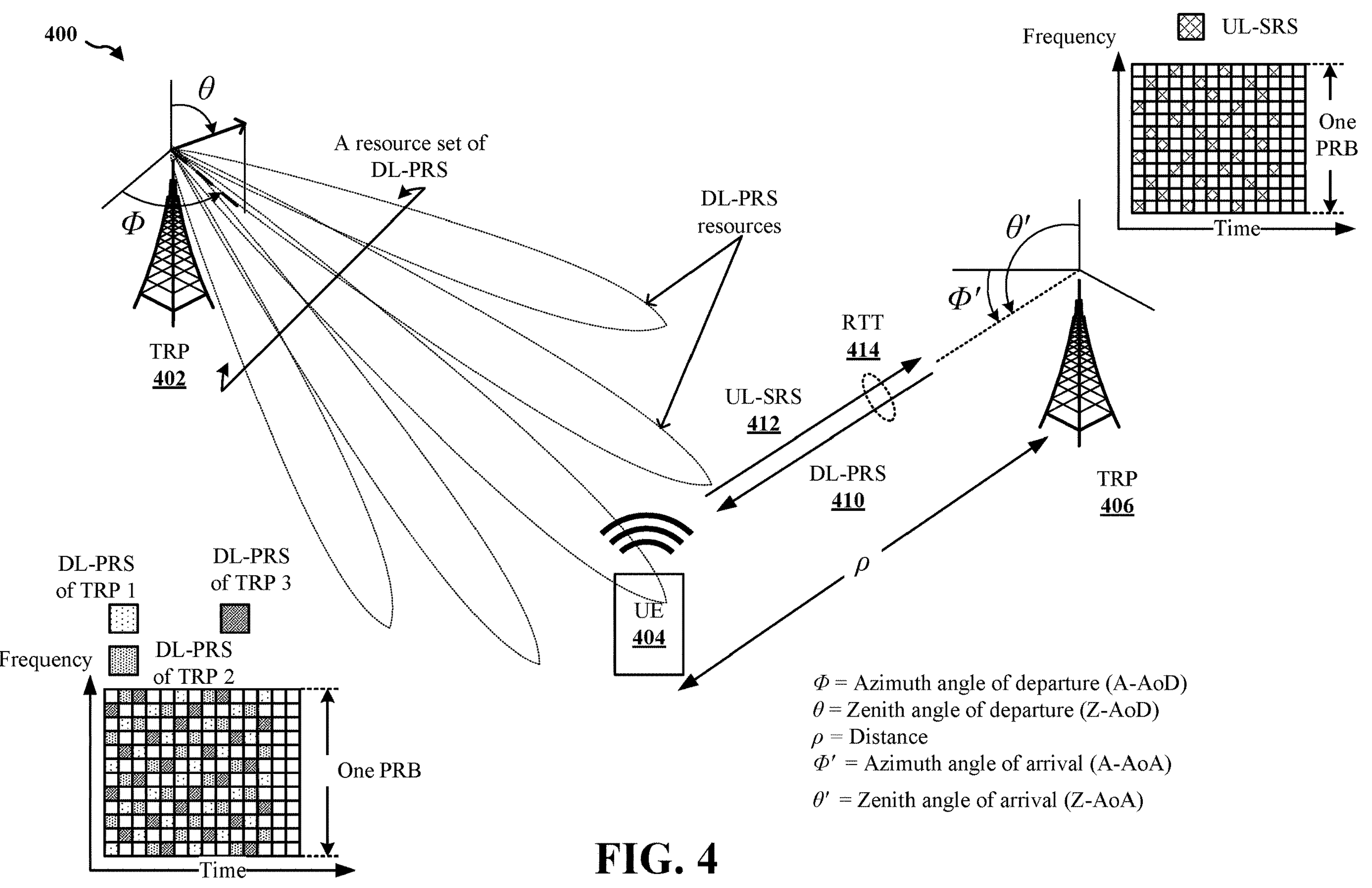
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s) 168) or the UE 404 may determine the RTT 414 based on $\|T_{SRS\_RX}-T_{PRS\_TX}|-|T_{SRS\_TX}-T_{PRS\_RX}\|$. Accordingly, multi-RTT positioning may make use of the UE Rx-Tx time difference measurements (i.e., $|T_{SRS\_TX}-T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX}-T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402,406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402,406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

Figure 5:
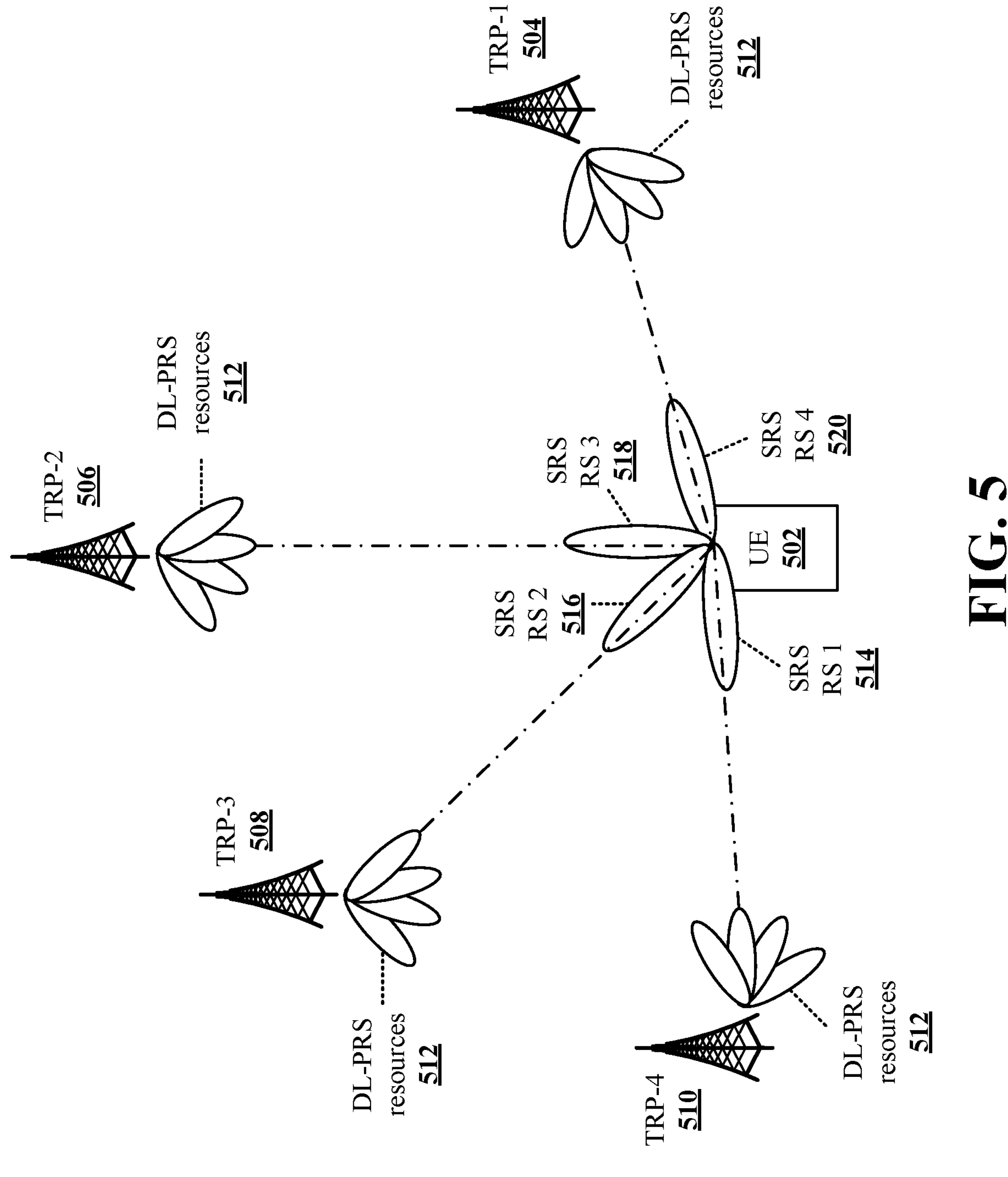
FIG. 5 is a diagram illustrating an example of a wireless communication system.

FIG. 5 is a diagram 500 illustrating an example of estimating a position of a UE based on multi-RTT measurements from multiple TRPs in accordance with various aspects of the present disclosure. A UE 502 may be configured by a serving base station to decode DL-PRS resources 512 that correspond to and are transmitted from a first TRP 504 (TRP-1), a second TRP 506 (TRP-2), a third TRP 508 (TRP-3), and a fourth TRP 510 (TRP-4). The UE 502 may also be configured to transmit UL-SRSs on a set of UL-SRS resources, which may include a first SRS resource 514, a second SRS resource 516, a third SRS resource 518, and a fourth SRS resource 520, such that the serving cell(s), e.g., the first TRP 504, the second TRP 506, the third TRP 508, and the fourth TRP 510, and as well as other neighbor cell(s), may be able to measure the set of the UL-SRS resources transmitted from the UE 502. For multi-RTT measurements based on DL-PRS and UL-SRS, as there may be an association between a measurement of a UE for the DL-PRS and a measurement of a TRP for the UL-SRS, the smaller the gap is between the DL-PRS measurement of the UE and the UL-SRS transmission of the UE, the better the accuracy may be for estimating the position of the UE and/or the distance of the UE with respect to each TRP.

In some aspects of wireless communication, the terms "positioning reference signal" and "PRS" may generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. In some aspects, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS. PTRS), the signals may be prepended with "UL" or "DL" to distinguish the direction. For example, "UL-DMRS" may be differentiated from "DL-DMRS."

Figure 6:
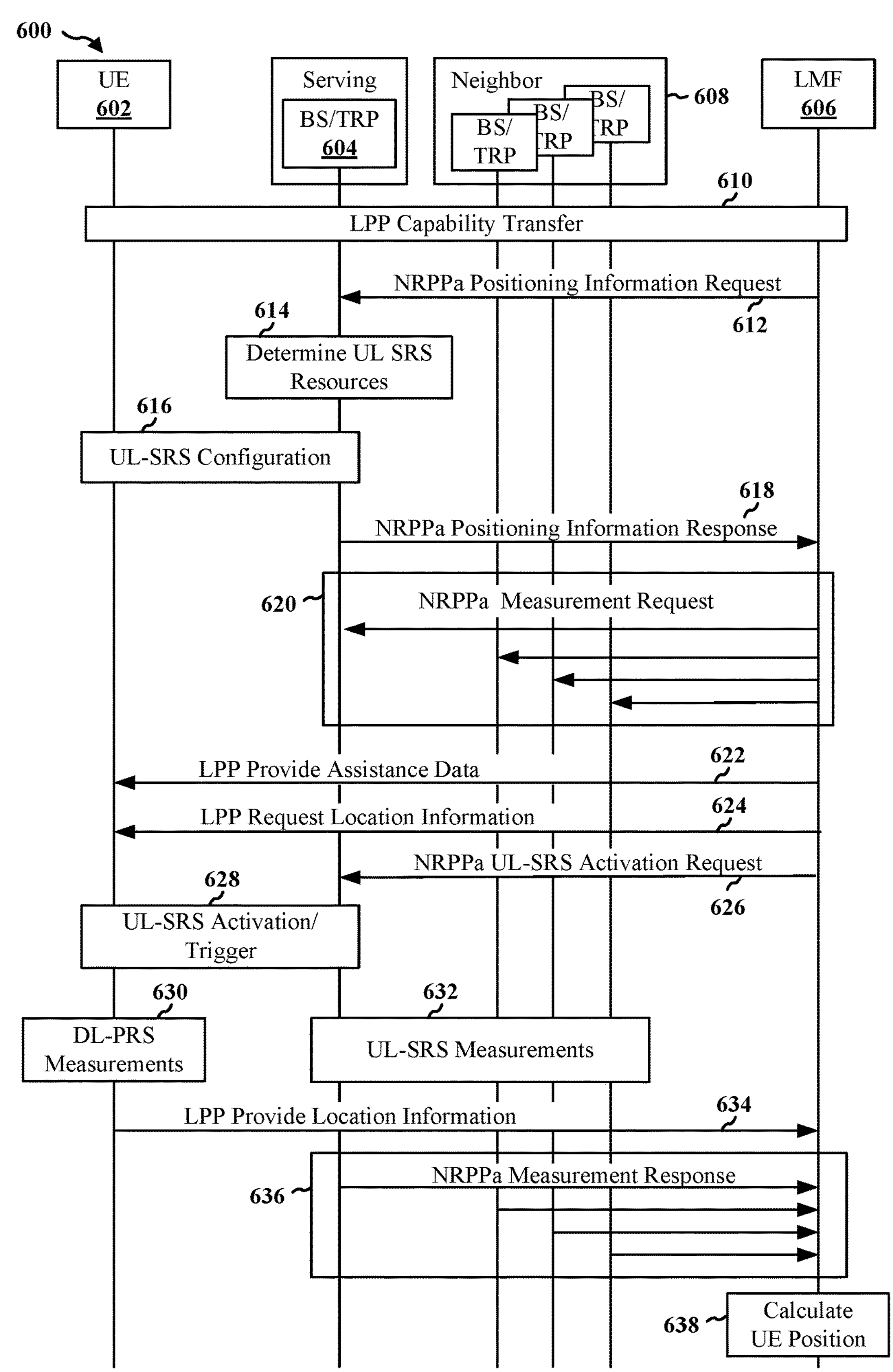
FIG. 6 is a diagram illustrating an example positioning procedure.

FIG. 6 is a communication flow 600 illustrating an example multi-RTT positioning procedure in accordance with various aspects of the present disclosure. The numberings associated with the communication flow 600 do not specify a particular temporal order and are merely used as references for the communication flow 600. In addition, a DL-only and/or an UL-only positioning may use a subset or subsets of this multi-RTT positioning procedure.

At 610, an LMF 606 may request one or more positioning capabilities from a UE 602 (e.g., from a target device). In some examples, the request for the one or more positioning capabilities from the UE 602 may be associated with an LTE Positioning Protocol (LPP). For example, the LMF 606 may request the positioning capabilities of the UE 602 using an LPP capability transfer procedure. At 612, the LMF 606 may request UL SRS configuration information for the UE 602. The LMF 606 may also provide assistance data specified by a serving base station 604 (e.g., pathloss reference, spatial relation, and/or SSB configuration(s), etc.). For example, the LMF 606 may send an NR Positioning Protocol A (NRPPa) positioning information request message to the serving base station 604 to request UL information for the UE 602.

At 614, the serving base station 604 may determine resources available for UL SRS, and at 616, the serving base station 604 may configure the UE 602 with one or more UL SRS resource sets based on the available resources. At 618, the serving base station 604 may provide UL SRS configuration information to the LMF 606, such as via an NRPPa positioning information response message. At 620, the LMF 606 may select one or more candidate neighbor BSs/TRPs 608, and the LMF 606 may provide an UL SRS configuration to the one or more candidate neighbor BSs/TRPs 608 and/or the serving base station 604, such as via an NRPPa measurement request message. The message may include information for enabling the one or more candidate neighbor BSs/TRPs 608 and/or the serving base station to perform the UL measurements.

At 622, the LMF 606 may send an LPP provide assistance data message to the UE 602. The message may include specified assistance data for the UE 602 to perform the DL measurements. At 624, the LMF 606 may send an LPP request location information message to the UE 602 to request multi-RTT measurements. At 626, for semi-persistent or aperiodic UL SRS, the LMF 606 may request the serving base station 604 to activate/trigger the UL SRS in the UE 602. For example, the LMF 606 may request activation of UE SRS transmission by sending an NRPPa positioning activation request message to the serving base station 604.

At 628, the serving base station 604 may activate the UE SRS transmission and send an NRPPa positioning activation response message. In response, the UE 602 may begin the UL-SRS transmission according to the time domain behavior of UL SRS resource configuration. At 630, the UE 602 may perform the DL measurements from the one or more candidate neighbor BSs/TRPs 608 and/or the serving base station 604 provided in the assistance data. At 632, each of the configured one or more candidate neighbor BSs/TRPs 608 and/or the serving base station 604 may perform the UL measurements. At 634, the UE 602 may report the DL measurements to the LMF 606, such as via an LPP provide location information message. At 636, each of the one or more candidate neighbor BSs/TRPs 608 and/or the serving base station 604 may report the UL measurements to the LMF 606, such as via an NRPPa measurement response message. At 638, the LMF 606 may determine the RTTs from the UE 602 and BS/TRP Rx-Tx time difference measurements for each of the one or more candidate neighbor BSs/TRPs 608 and/or the serving base station 604 for which corresponding UL and DL measurements were provided at 634 and 636, and the LMF 606 may calculate the position of the UE 602.

Some aspects of wireless communication may utilize different types of positioning reference signals (PRSs), such as downlink (DL) PRSs. PRSs are utilized by different wireless communications (e.g., new radio (NR)) and positioning methods in order to enable devices (e.g., UEs) to detect and measure different objects. For example, PRSs may enable UEs to detect and measure an increased about of neighbor TRPs or base stations. Several different types of positioning configurations are supported in wireless communications in order to enable a variety of deployments or environments for the devices or UEs (e.g., indoor environments, outdoor environments, sub-6 environments, mmW environments). Both UE-assisted positioning methods (e.g., calculations) and UE-based position methods are supported by different types of wireless communications (e.g., NR). Further, some types of positioning methods may be supported by specific types of wireless communication (e.g., NR). For instance, NR positioning methods may support at least one of: NR multiple round trip time (multi-RTT) positioning, NR downlink (DL) time difference of arrival (DL-TDOA) positioning, or NR DL angle of departure (DL-AoD) positioning.

In some aspects, different types of reference signals (e.g., downlink (DL) or uplink (UL) reference signals) and UE measurements may be utilized to facilitate the support of different positioning techniques. For example, DL PRSs and DL reference signal time difference (RSTD) UE measurements may facilitate support of DL-TDOA positioning. Also, DL PRSs and DL PRS reference signal received power (RSRP) UE measurements may facilitate support of DL-TDOA positioning. DL-AoD positioning, and/or multi-RTT positioning. Moreover, DL PRSs and sounding reference signals (SRS) for positioning and UE reception (Rx)-transmission (Tx) time different UE measurements may facilitate support of multi-RTT positioning. Further, synchronization signal blocks (SSBs) and channel state information (CSI)-reference signals (CSI-RSs) for radio resource management (RRM), as well as synchronization signal (SS)-RSRP (e.g., RSRP for RRM), SS-reference signal received quality (SS-RSRQ) (e.g., for RRM), CSI-RSRP (e.g., for RRM), and CSI-RSRP (e.g., for RRM), may facilitate support of enhanced-cell identifier (ID) (E-CID) positioning.

Different aspects of positioning may also utilize preconfigured DL PRS assistance data (AD). Preconfigured DL PRS AD may refer to the DL-PRS assistance data (with associated validity criteria) that may be provided to the UE (e.g., before or during an ongoing LTE positioning protocol (LPP) positioning session), to be then utilized for potential positioning measurements at a subsequent time (e.g., for deferred mobile terminated location request (MT-LR)). In some aspects, pre-configured DL-PRS assistance data may include multiple instances, where each instance may be applicable to a different area within the network. Also, each DL-PRS assistance data instance may be associated with an area ID. In some instances, the area ID may include a list of cells where the UE may be camped on/connected. Further, an applicable area ID at the UE location may be selected based on the cell where the UE is camped on/connected. The instance of the assistance data may be valid/selected if the UE is camped on/connected to one of the cells indicated within the list of cells in the arca ID.

Figure 7:
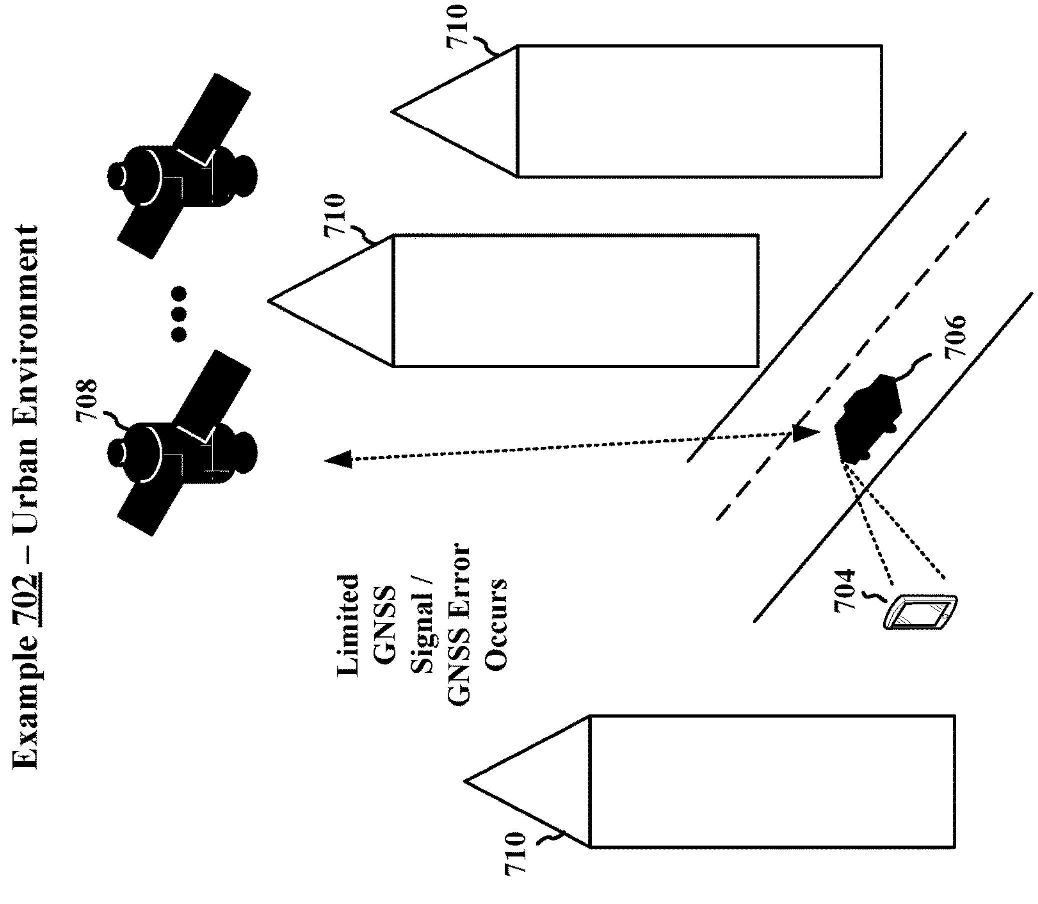
FIG. 7 is a diagram illustrating an example of a UE in an urban environment.

FIG. 7 is a diagram 700 illustrating an example 702 of a UE 704 in an urban environment. In an example, the UE 704 may be a cellphone of a person in a vehicle 706 (e.g., a car, a truck, etc.) or the UE 704 may be a part of the vehicle 706. As the UE 704 travels about the urban environment (e.g., an urban environment including buildings 710), the UE 704 may determine a position of the UE 704 via a GNSS system including one or more space vehicles 708 (e.g., one space vehicle, two space vehicles, three space vehicles, four space vehicles, five space vehicles, etc.). The one or more space vehicles 708 may also be referred to as one or more satellites or one or more satellite vehicles. Via a GNSS engine of the UE 704, the UE 704 may compute its position on a planet (e.g., a longitude, a latitude, an altitude/elevation) based on signals (i.e., time signals) transmitted (e.g., along a line of sight (LoS)) by the one or more space vehicles 708 that are received and measured by the UE 704. Computing the position of the UE 704 may be referred to as computing a GNSS fix. In an example, a computed GNSS fix may have a precision ranging from a few centimeters to a few meters (e.g., less than 10 meters, less than 100 meters). The UE 704 may utilize the computed location for various purposes, such as for navigating from place to place.

The UE 704 may utilize assistance information (which may also be referred to as "assistance data") in addition to the measured signals to compute its position. For instance, the assistance information may include information about the one or more space vehicles 708 (i.e., satellite acquisition assistance information (also referred to as satellite steering information)), timing information of the UE 704, and/or coarse position information of the UE 704. The coarse position information of the UE 704 may have a precision ranging from several hundred meters to several thousand meters. The assistance information may enable the UE 704 to compute its position in a faster manner compared to a UE that computes its position solely based on the signals transmitted by the one or more space vehicles 708. The assistance information may be generated by the UE 704 or the assistance information may be provided to the UE from another source (e.g., a base station, an access point, a core network, etc.). In an example, the assistance information may be generated from a component of the UE 704 that is external to a GNSS engine of the UE 704. The UE 704 may obtain the assistance information periodically (e.g., once a second).

The UE 704 may undergo/detect an error which may cause the UE 704 to lose a GNSS fix. When the GNSS fix is lost, the UE 704 may not be able to determine its position. In an example, the error may be due to a loss of a LoS (e.g., caused by large buildings in an urban environment) between the UE 704 and the one or more space vehicles 708. In another example, the error may be due to a problem with the GNSS engine.

When the UE 704 detects the error, the UE 704 may trigger an error recovery process in order to recover from the error (i.e., recover from an error state) and to obtain a new GNSS fix. In an example, upon triggering the error state, the UE 704 may delete assistance information (e.g., all assistance information) that was obtained prior to the error state being triggered. The UE 704 may the perform a blind search for the one or more space vehicles 708. As the assistance information has been deleted, the UE 704 may not utilize the assistance information to aid in obtaining the GNSS fix. In a specific example, after a full error recovery, there may be an injection of coarse position information (CPI) from an external application processor (AP) of the UE; however, a GNSS engine of the UE 704 may not accept the CPI until a high confidence GNSS fix is made without the assistance of the CPI.

When a GNSS signal environment is not optimal (e.g., such as in an urban environment), the UE 704 may take a relatively long time to track and decode information from the one or more space vehicles 708, which may cause the UE 704 to take a relatively long time to obtain a GNSS fix. This may impact user experience. For instance, in an example involving navigation in the vehicle 706, if the UE 704 takes a relatively long time to obtain a GNSS fix, a navigation system of the UE 704 or the vehicle 706 may not provide prompt navigation instructions to a driver of the vehicle, and as a result, the driver may miss a turn, which may delay the driver.

Figure 8:
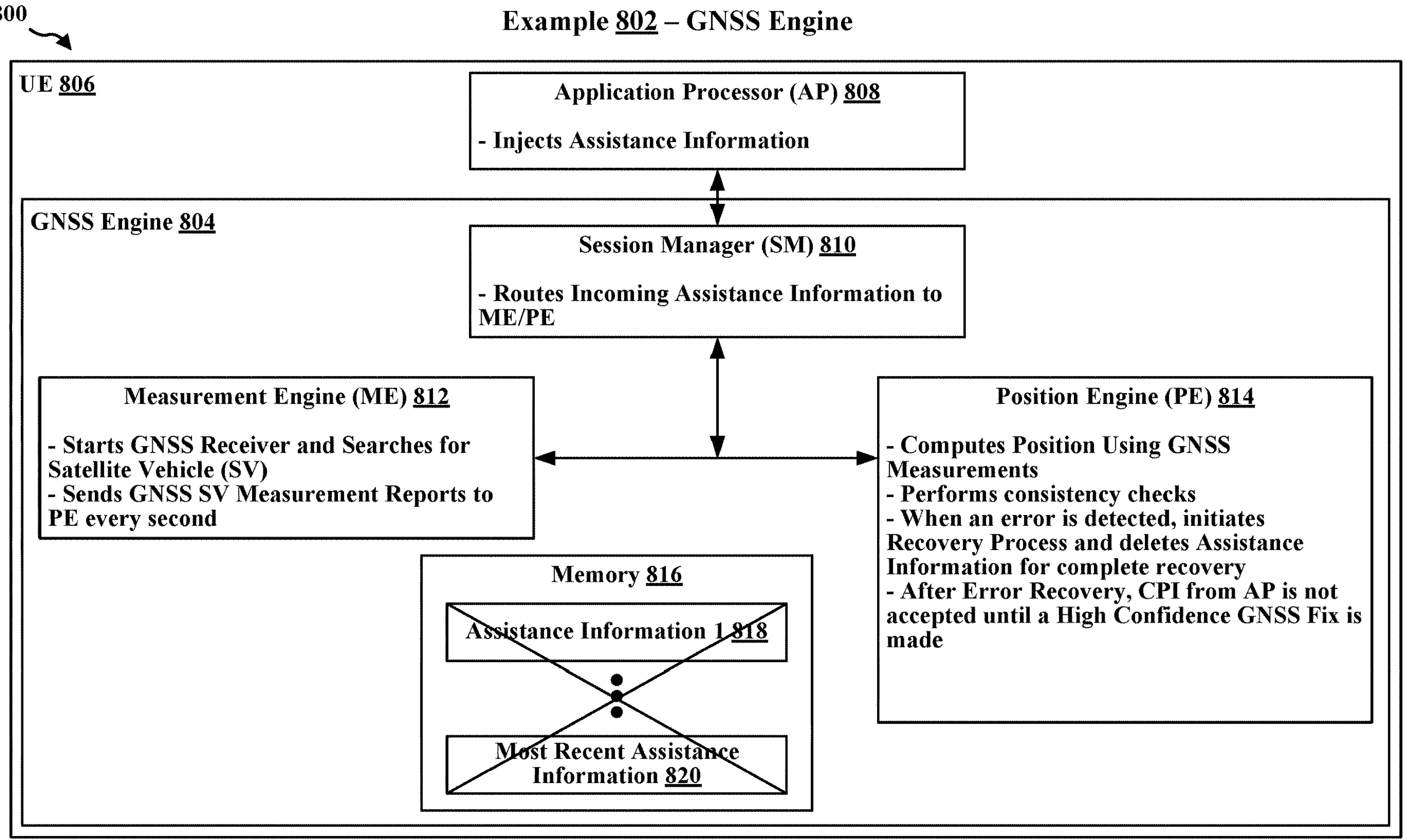
FIG. 8 is a diagram illustrating an example of a GNSS engine.

FIG. 8 is a diagram 800 illustrating an example 802 of a GNSS engine 804. The GNSS engine 804 may be included in a UE 806. In general, the GNSS engine 804 may be configured to obtain a GNSS fix for the UE 806. The GNSS engine 804 may be implemented in hardware and/or software. In an example, the UE 806 may be or include the UE 104, the UE 350, the UE 704, etc. The UE 806 may include an application processor (AP) 808. The AP 808 may be external to the GNSS engine 804. The AP 808 may be configured to (1) generate/obtain assistance information and (2) inject (i.e., provide) the assistance information to the GNSS engine 804. In an example, the AP 808 may be associated with an application layer of the UE 806. In an example, the assistance information may include information about one or more space vehicles (i.e., satellite acquisition assistance information (also referred to as satellite steering information)), timing information of the UE 806, and/or coarse position information of the UE 806. The AP 808 may be configured to inject assistance information periodically (e.g., once a second, once a minute, etc.).

The GNSS engine 804 may include a session manager (SM) 810, a measurement engine (ME) 812, and a position engine (PE) 814. The SM 810 may be configured to (1) receive the assistance information injected to the GNSS engine 804 by the AP 808 and (2) route the assistance information to the ME 812 and/or the PE 814. In an example, the SM 810 (or the UE 806) may store first assistance information 818 and most recent assistance information 820 in memory 816 of the GNSS engine 804, where the first assistance information may be injected to the GNSS engine 804 prior to the most recent assistance information 820. Although the memory 816 is depicted in the diagram 800 as being part of the GNSS engine 804, in some examples, the memory 816 may be separate from the GNSS engine 804.

The ME 812 may be configured to start a GNSS receiver of the UE 806 and to search for space vehicle(s) (i.e., satellite vehicle(s)) via the GNSS receiver. The ME 812 may also be configured to (1) perform measurements on signals transmitted by the space vehicle(s) via the GNSS receiver and (2) generate and send GNSS space vehicle measurement reports to the PE 814 at a certain periodicity (e.g., once a second), where the GNSS space vehicle measurement reports may include the measurements (or indications thereof) performed on the signals transmitted by the space vehicle(s). The GNSS space vehicle measurement reports may also include uncertainty values (or indications thereof) for each of the measurements performed on the signals transmitted by the space vehicle(s).

The PE 814 may compute a position (i.e., obtain a GNSS fix) of the UE 806 based on the GNSS space vehicle measurement reports. The PE 814 may compute the position of the UE 806 additionally based on the assistance information injected by the AP 808. The PE 814 may be configured to perform a consistency check between (1) coarse position information (CPI) of the UE 806 in the assistance information and (2) a GNSS fix obtained by the PE 814. If the CPI and the GNSS fix are consistent, the PE 814 may accept the CPI and utilize the CPI to obtain subsequent GNSS fixes.

When the GNSS engine 804 and/or the UE 806 detect a GNSS error, the PE 814 may be configured to initiate an error recovery process. As part of the error recovery process, the PE 814 may delete assistance information stored in the memory 816. For instance, the PE 814 may delete the first assistance information 818 and the most recent assistance information 820 from the memory 816. After the error recovery process concludes, the PE 814 may not accept new assistance information (e.g., new CPI) injected by the AP 808 until the PE 814 makes a high confidence GNSS fix, that is, the PE 814 may accept new assistance information when the PE 814 makes a GNSS fix that has an uncertainty value that is below a threshold uncertainty value.

Figure 9:
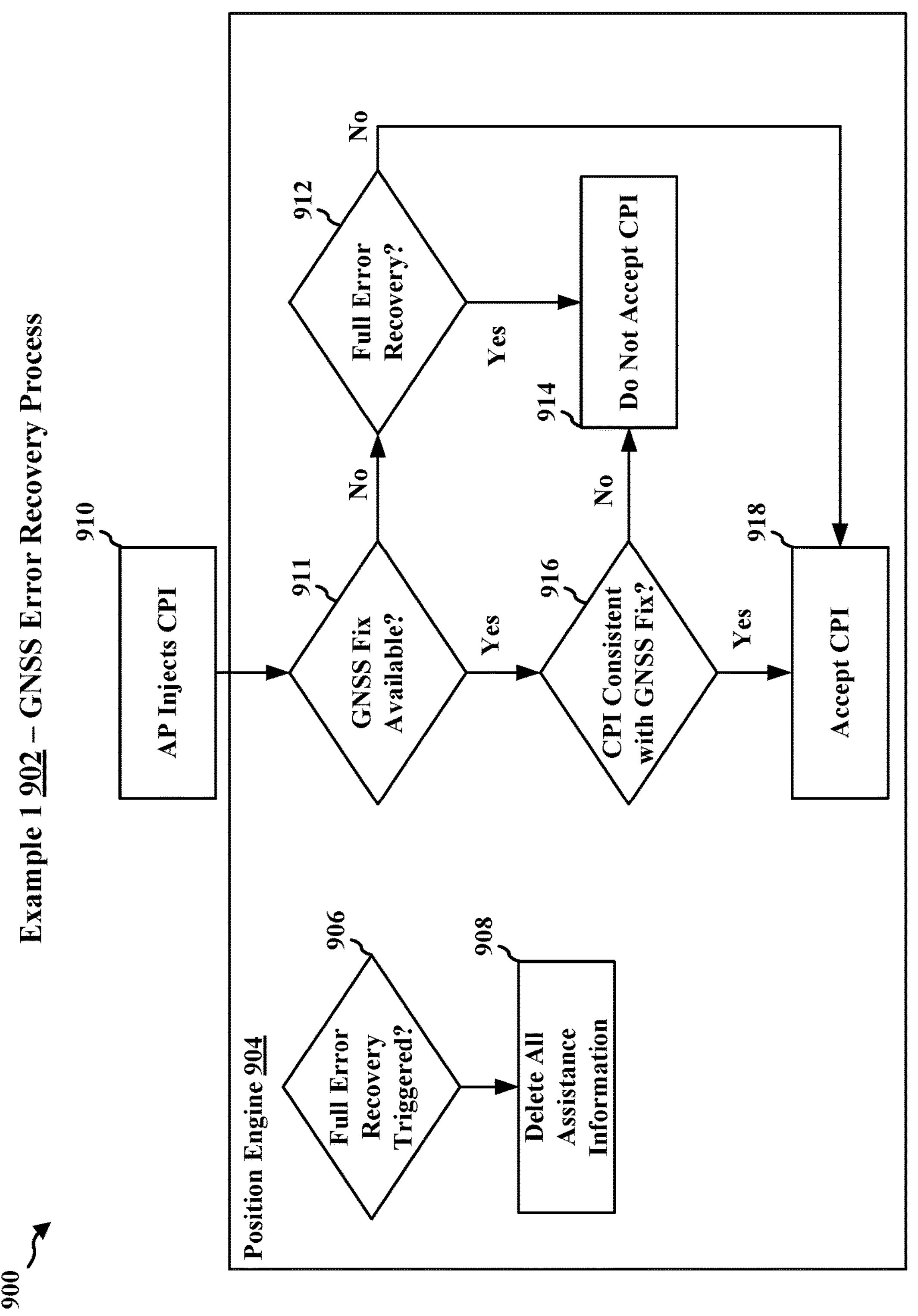
FIG. 9 is a diagram illustrating an example of a GNSS error recovery process.

FIG. 9 is a diagram 900 illustrating an example 902 of a GNSS error recovery process performed by a position engine 904. In an example, the position engine 904 may be or include the PE 814. The position engine 904 may obtain an indication of a GNSS error or the position engine 904 may detect a GNSS error. At 906, the position engine 904 may determine whether a full error recovery (as opposed to a partial error recovery) was triggered by the error. Upon determination that the full error recovery was triggered, at 908, the position engine 904 may delete all assistance information from memory (e.g., delete all assistance information from the memory 816).

At 910, an application processor (e.g., the AP 808) may inject CPI into the position engine 904. At 911, the position engine 904 may determine whether a GNSS fix is available. Upon negative determination, at 912, the position engine 904 may determine whether a full error recovery has occurred. Upon positive determination, at 914, the position engine 904 may reject the CPI (i.e., "Do not accept CPI"). Upon negative determination, at 918, the position engine 904 may accept the CPI.

Referring back to 911, upon determination that the GNSS fix is available, at 916, the position engine 904 may determine whether the CPI is consistent with the GNSS fix. For instance, the position engine 904 may determine whether the CPI is within threshold range(s) of the GNSS fix based on an uncertainty value associated with the GNSS fix. Upon negative determination, at 914, the position engine 904 may reject the CPI. Upon positive determination, at 918, the position engine 904 may accept the CPI. The position engine 904 may utilize the CPI to obtain a subsequent GNSS fix. In one aspect, 910, 911, 912, 914, and/or 916 may occur repeatedly in cycles until the CPI is accepted at 918.

As noted above, a UE may utilize a GNSS system in order to determine a position of the UE (i.e., produce/obtain a GNSS fix). For instance, the UE may perform measurements on signals transmitted by satellites(s) and the UE may compute its position based on the measurements. Furthermore, the UE may also utilize assistance information in addition to the measurements in order to determine the position of the UE in a more rapid manner, where the assistance information may be obtained/produced by the UE periodically and stored in memory of the UE. In an example, the assistance information may include timing information of the UE, coarse position information of the UE, and satellite acquisition information. In some scenarios, a GNSS error may occur/be detected, where the GNSS error may be caused by the UE being unable to obtain a GNSS fix. Upon detecting the GNSS error, the UE may perform an error recovery process. As part of the error recovery process, the UE may delete the assistance information from the memory. The UE may then perform a blind search for satellite(s) without using assistance information in order to obtain a GNSS fix. After the UE has obtained the GNSS fix, the UE may obtain new assistance information. However, obtaining a GNSS fix without assistance information may take a relatively long amount of time and/or may take a relatively large amount of computational resources of the UE, which may affect user experience.

Various technologies pertaining to improving a time to produce a GNSS fix after an error recovery in a limited GNSS signal environment are described herein. In an example, a UE obtains an indication of an occurrence of a global navigation satellite system (GNSS) error. The UE stores, in memory and based on the indication, first position information for the UE that was obtained prior to the obtainment of the indication. The UE obtains, subsequent to an error recovery process, second position information for the UE. The UE accepts or rejects the second position information based on a comparison of the first position information, the second position information, and a set of conditions for the first position information and the second position information. Vis-à-vis storing the first position information (i.e., most recent position information) in the memory (as opposed to deleting the first position information) and accepting the second position information based on the comparison of the first position information, the second position information, and the set of conditions, the UE may be able to obtain a GNSS fix in a more rapid manner compared to a UE that deletes all assistance information as part of an error recovery process. Furthermore, by the comparison of the first position information, the second position information, and the set of conditions, the UE may accept the second position information with a reasonable amount of certainty that the second position information is not erroneous. Thus, the aforementioned technologies may improve user experience and/or conserve computational resources.

When there is an error recovery triggered by a UE error state, all assistance data (such as time, position, satellite information, etc.) may be deleted. A GNSS engine may conduct a blind search for satellites and may not use coarse time and/or Extended Assistance (XTRA) data which may be present in the system even after error recovery. In one aspect, upon UE error recovery, all assistance data may be deleted except last injected coarse position injection (CPI) from an AP (e.g., an external AP). When a new CPI is injected by the AP, a UE may compare proximity of the new CPI against cached CPI, and the UE may ignore the new CPI if it is the same as or close to the cached CPI, as the new CPI may likely be stale/bad information that caused the UE error state. The UE may more quickly acquire/track satellites based on either the old or new CPI.

As noted above, various technologies pertaining to improving a time to produce a GNSS fix after an error recovery in a limited GNSS signal environment are described herein. In an example, when a GNSS error recovery is triggered by an error, a UE may delete previously obtained assistance information (i.e., all assistance information) except for a last injected coarse position information (CPI) of the UE. For instance, the UE may cache the last injected CPI and delete the assistance information. After error recovery, when a new CPI is injected by an application processor prior to the obtainment of a new GNSS fix, instead of dropping/not accepting the new CPI, the UE may perform a proximity check of the new CPI with the cached last injected CPI, where the last injected CPI was cached prior to conclusion of the error recovery. If the new CPI is the same as or close to the cached last injected CPI, the UE may not accept (i.e., reject) the new CPI, as the new CPI may be associated with "stale" or "bad" information that caused the error. If the new CPI is different from and/or changing (in terms of proximity/distance) compared to the cached last injected CPI, the UE may accept the new CPI. The UE may then utilize the new CPI to obtain a GNSS fix. Additionally, before accepting the new CPI, a GNSS engine of the UE may inflate (i.e., increase) a position uncertainty of the new CPI until the position uncertainty is useful for generating satellite steering information (i.e., satellite acquisition assistance information). The aforementioned technologies may be associated with various advantages. For instance, by accepting the CPI (or by accepting the CPI with presence of coarse time information), the UE may be able to generate satellite steering information, which may help a measurement engine of the UE to acquire/track satellites faster in order to improve (i.e., reduce) a time to produce a GNSS fix.

Figure 10:
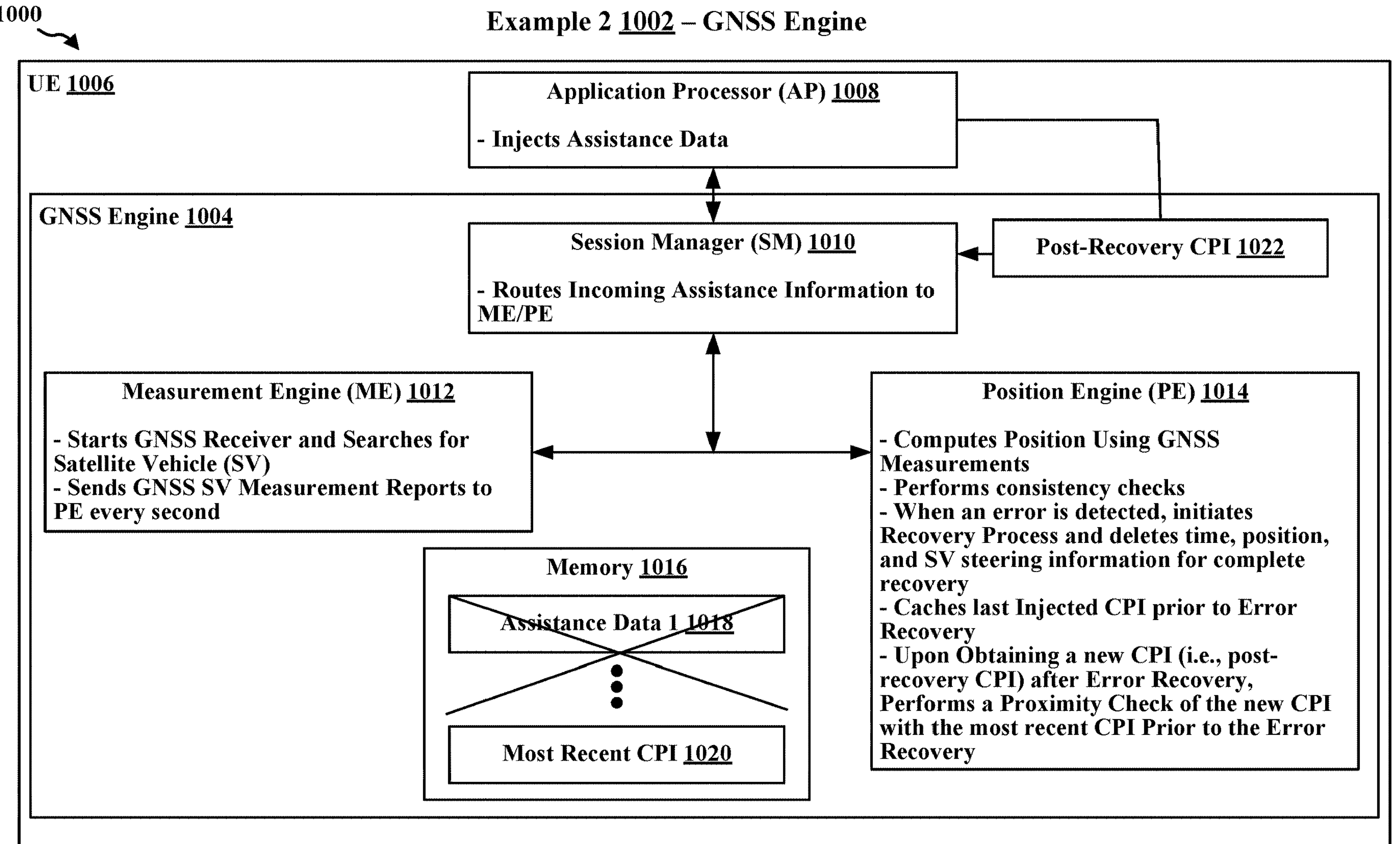
FIG. 10 is a diagram illustrating an example of a GNSS engine.

FIG. 10 is a diagram 1000 illustrating an example 1002 of a GNSS engine 1004. The GNSS engine 1004 may be included in a UE 1006. In general, the GNSS engine 1004 may be configured to obtain a GNSS fix for the UE 1006. The GNSS engine 1004 may be implemented in hardware and/or software. In an example, the UE 1006 may be or include the UE 104, the UE 350, the UE 704, etc. The UE 1006 may include an application processor (AP) 1008. The AP 1008 may be external to the GNSS engine 1004. The AP 1008 may be configured to (1) generate/obtain assistance information and (2) inject (i.e., provide) the assistance information to the GNSS engine 1004. In an example, the AP 1008 may be associated with an application layer of the UE 1006. In an example, the assistance information may include information about one or more space vehicles (i.e., satellite acquisition assistance information (also referred to as satellite steering information)), timing information of the UE 1006, and/or coarse position information of the UE 1006. The AP 1008 may be configured to inject assistance information periodically (e.g., once a second, once a minute, etc.)

The GNSS engine 1004 may include a session manager (SM) 1010, a measurement engine (ME) 1012, and a position engine (PE) 1014. The SM 1010 may be configured to (1) receive the assistance information injected to the GNSS engine 1004 by the AP 1008 and (2) route the assistance information to the ME 1012 and/or the PE 1014. In an example, the SM 1010 (or the UE 1006) may store first assistance information 1018 and most recent assistance information in memory 1016 of the GNSS engine 1004, where the first assistance information may be injected to the GNSS engine 1004 prior to the most recent assistance information, and where the most recent assistance information includes most recent CPI 1020. Although the memory 1016 is depicted in the diagram 1000 as being part of the GNSS engine 1004, in some examples, the memory 1016 may be separate from the GNSS engine 1004.

The ME 1012 may be configured to start a GNSS receiver of the UE 1006 and to search for space vehicle(s) (i.e., satellite vehicle(s)) via the GNSS receiver. The ME 1012 may also be configured to (1) perform measurements on signals transmitted by the space vehicle(s) via the GNSS receiver and (2) generate and send GNSS space vehicle measurement reports to the PE 1014 at a certain periodicity (e.g., once a second), where the GNSS space vehicle measurement reports may include the measurements (or indications thereof) performed on the signals transmitted by the space vehicle(s). The GNSS space vehicle measurement reports may also include uncertainty values (or indications thereof) for each of the measurements performed on the signals transmitted by the space vehicle(s).

The PE 1014 may compute a position (i.e., obtain a GNSS fix) of the UE 1006 based on the GNSS space vehicle measurement reports. The PE 1014 may compute the position of the UE 1006 additionally based on the assistance information injected by the AP 1008. The PE 1014 may be configured to perform a consistency check between (1) coarse position information (CPI) of the UE 1006 in the assistance information and (2) a GNSS fix obtained by the PE 1014. If the CPI and the GNSS fix are consistent, the PE 1014 may accept the CPI and utilize the CPI to obtain subsequent GNSS fixes.

When the GNSS engine 1004 and/or the UE 1006 detect a GNSS error, the PE 1014 may be configured to initiate an error recovery process. As part of the error recovery process, the PE 1014 may delete assistance information stored in the memory 1016 with the exception of the most recent CPI 1020, that is, the PE 1014 may cache the most recent CPI 1020. The most recent CPI 1020 may correspond to a time instance that occurred prior to the detection of the GNSS error. For instance, the PE 1014 may delete the first assistance information 1018 from the memory 1016.

After conclusion of the error recovery process, the AP 1008 may inject post-recovery assistance information into the GNSS engine 1004, where the post-recovery assistance information may include post-recovery CPI 1022. The PE 1014 may determine whether the post-recovery CPI 1022 is the same as or close to the most recent CPI 1020, that is, the PE 1014 may determine whether the post-recovery CPI 1022 and the most recent CPI 1020 satisfy a set of conditions. In an example, the set of conditions may include a difference between the most recent CPI 1020 and the post-recovery CPI 1022 being greater than a difference threshold, a position uncertainty level between the most recent CPI 1020 and the post-recovery CPI 1022 being greater than a position uncertainty threshold, and/or a source of the most recent CPI 1020 and a source of the post-recovery CPI 1022 being different. In an example, a source of CPI (e.g., the most recent CPI 1020, the post-recovery CPI 1022, etc.) may be the UE 1006, a base station, a core network (e.g., an LMF of a core network), a WLAN access point, etc. If the post-recovery CPI 1022 is the same as or close to the most recent CPI 1020 (i.e., if the post-recovery CPI 1022 and the most recent CPI 1020 do not satisfy the set of conditions), the PE 1014 may reject (i.e., not accept) the post-recovery CPI 1022. If the post-recovery CPI 1022 is different from and/or changing (in terms of distance/proximity) from the most recent CPI 1020 (i.e., if the post-recovery CPI 1022 and the most recent CPI 1020 satisfy the set of conditions), the PE 1014 may accept the post-recovery CPI 1022. The PE 1014 may then utilize the post-recovery CPI 1022 to obtain a GNSS fix for the UE 1006. The UE 1006 may also increase (i.e., inflate) a position uncertainty of the post-recovery CPI 1022 upon accepting the post-recovery CPI 1022. By storing the most recent CPI 1020 in the memory 1016 and by comparing the most recent CPI 1020, the post-recovery CPI 1022, and the set of conditions, the GNSS engine 1004 may be able to obtain a GNSS fix in a faster manner than the GNSS engine 804.

Figure 11:
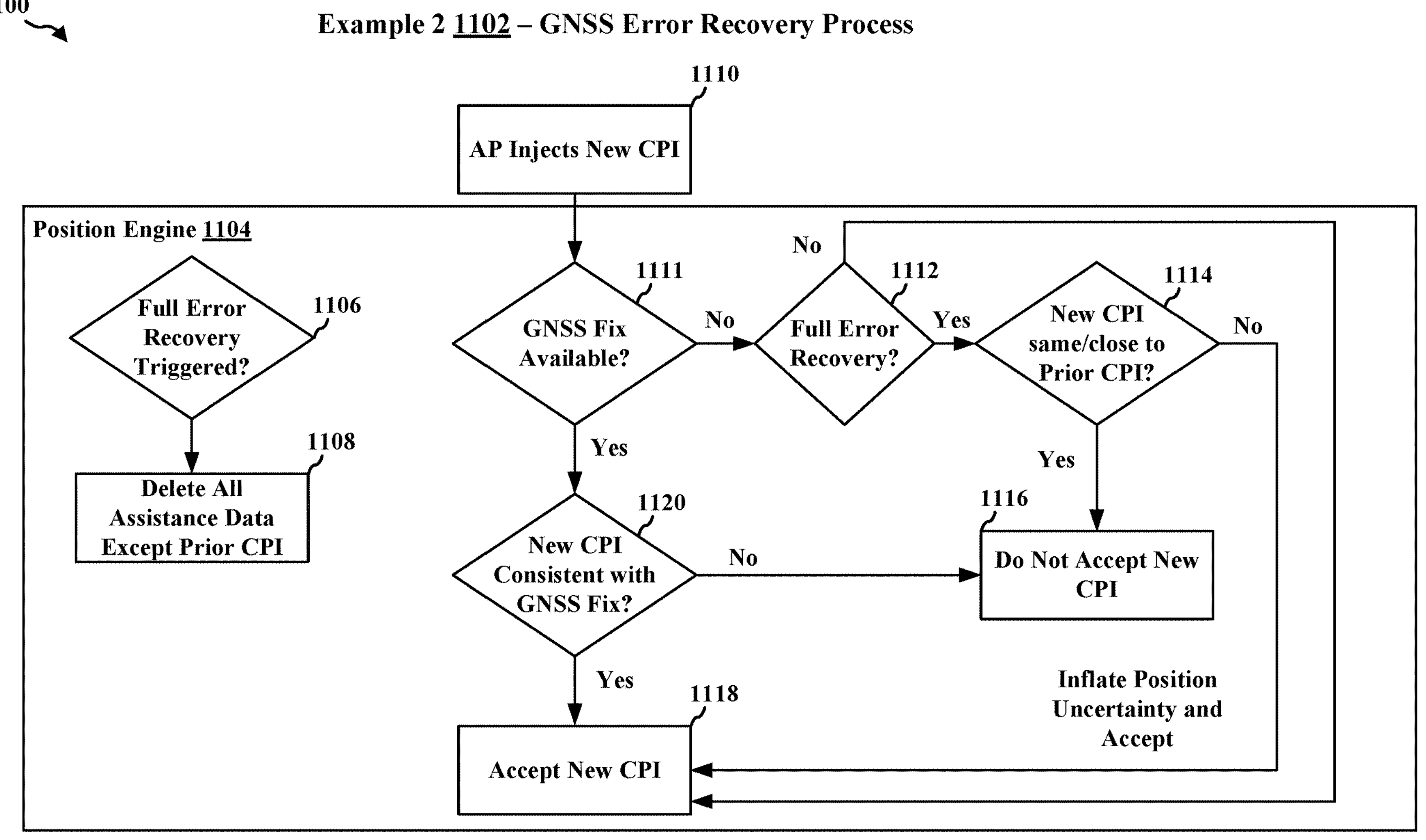
FIG. 11 is a diagram illustrating an example of a GNSS error recovery process.

FIG. 11 is a diagram 1100 illustrating an example 1102 of a GNSS error recovery process performed by a position engine 1104. In an example, the position engine 1104 may be or include the PE 1014. The position engine 1104 may obtain an indication of a GNSS error or the position engine 1104 may detect a GNSS error. At 1106, the position engine 1104 may determine whether a full error recovery (as opposed to a partial error recovery) was triggered by the error. Upon determination that the full error recovery was triggered, at 1108, the position engine 1104 may delete all assistance information from memory except for the last CPI (i.e., the position engine 1104 may delete assistance information from the memory 1016 except for the most recent CPI 1020).

At 1110, an application processor (e.g., the AP 1008) may inject new CPI (e.g., the post-recovery CPI 1022) into the position engine 1104. At 1111, the position engine 1104 may determine whether a GNSS fix is available. Upon negative determination, at 1112, the position engine 1104 may determine whether a full error recovery has occurred. Upon positive determination, at 1114, the position engine 1104 may determine whether the new CPI is the same as or close to the prior CPI. Upon positive determination, at 1116, the position engine may reject (i.e., not accept) the new CPI. Upon negative determination, at 1118, the position engine 1104 may inflate (i.e., increase) a position uncertainty associated with the new CPI and the position engine 1104 may accept the new CPI. The position engine 1104 may utilize the new CPI to obtain a subsequent GNSS fix. Referring back to 1112, upon determination that the full error recovery was not triggered, at 1118, the position engine 1104 may accept the new CPI. The position engine 1104 may utilize the new CPI to obtain a subsequent GNSS fix.

Returning back to 1111, upon positive determination (i.e., upon determination that the GNSS fix is available), at 1120, the position engine 1104 may determine whether the new CPI is consistent with the GNSS fix. For instance, the position engine 1104 may determine whether the new CPI is within threshold range(s) of the GNSS fix based on an uncertainty value associated with the GNSS fix. Upon positive determination, at 1118, the position engine 1104 may accept the new CPI. The position engine 1104 may utilize the new CPI to obtain a subsequent GNSS fix. Upon negative determination, at 1116, the position engine 1104 may reject (i.e., not accept) the new CPI.

Figure 12:
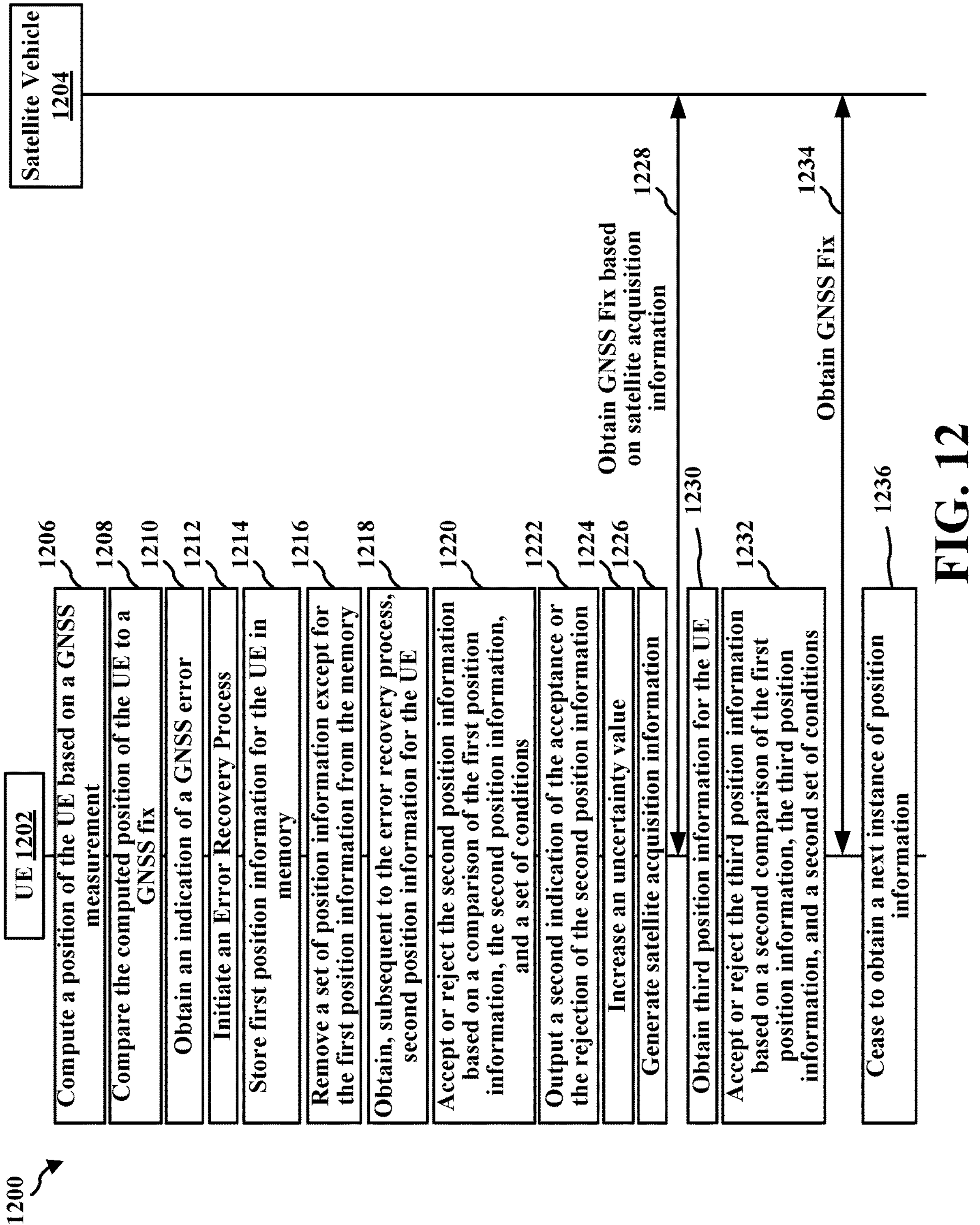
FIG. 12 is a diagram illustrating example communications of a UE and a satellite vehicle.

FIG. 12 is a diagram 1200 illustrating example communications of a UE 1202 and a satellite vehicle 1204. In an example, the UE 1202 may be or include the UE 104, the UE 350, the UE 704, or the UE 1006. In an example, the satellite vehicle 1204 may be included in the one or more space vehicles 708.

At 1210, the UE 1202 may obtain an indication of an occurrence of a global navigation satellite system (GNSS) error. The GNSS error may be associated with the satellite vehicle 1204. At 1214, the UE 1202 may store, in memory and based on the indication, first position information for the UE that was obtained prior to the obtainment of the indication. At 1218, the UE 1202 may obtain, subsequent to an error recovery process, second position information for the UE 1202. At 1220, the UE 1202 may accept or reject the second position information based on a comparison of the first position information, the second position information, and a set of conditions for the first position information and the second position information. At 1222, the UE 1202 may output a second indication of the acceptance or the rejection of the second position information.

At 1206, the UE 1202 may compute a position of the UE 1202 based on a GNSS measurement. At 1208, the UE 1202 may compare the computed position of the UE to a GNSS fix, where the obtainment of the indication of the occurrence of the GNSS error at 1210 may be based on the comparison. At 1216, the first position information may be included in a set of position information stored in the memory, and the UE 1202 may remove the set of position information except for the first position information from the memory based on the obtainment of the indication at 1210. At 1224, the second position information may be accepted and the UE 1202 may increase an uncertainty value associated with the second position information.

At 1226, the UE 1202 may generate, subsequent to the acceptance of the second position information, satellite acquisition assistance information based on the second position information. At 1228, the UE 1202 may obtain a GNSS fix (e.g., with the satellite vehicle 1204) based on the satellite acquisition assistance information. At 1212, the UE 1202 may initiate the error recovery process based on the obtainment of the indication at 1210, where the obtainment of the second position information at 1218 may occur after a conclusion of the error recovery process.

At 1230, the UE 1202 may obtain, subsequent to the rejection of the second position information, third position information for the UE 1202. At 1232, the UE 1202 may accept or reject the third position information based on a second comparison of the first position information, the third position information, and a second set of conditions for the first position information and the third position information.

At 1234, the UE 1202 may obtain, subsequent to the rejection of the second position information, a GNSS fix (e.g., with the satellite vehicle 1204). At 1236, the second position information may include multiple instances of position information for the UE each corresponding to subsequent time instances, where each of the multiple instances of the position information may be rejected based on comparisons between the first position information and the multiple instances of the position information, and the UE 1202 may cease to obtain a next instance of position information for the UE based on the obtainment of the GNSS fix at 1234.

Figure 13:
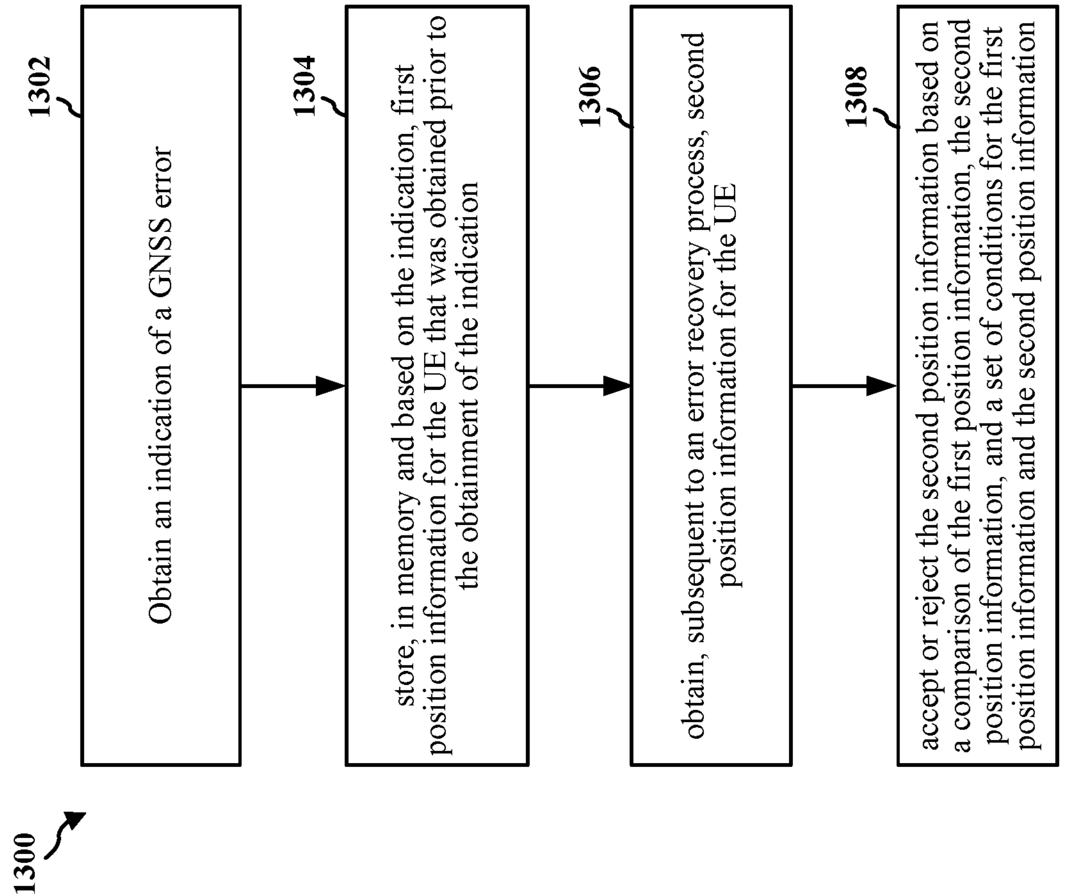
FIG. 13 is a flowchart of a method of wireless communication.

FIG. 13 is a flowchart 1300 of a method of wireless communication. The method may be performed by a UE (e.g., the UE 104, the UE 350, the UE 704, the UE 1006, the UE 1202, the apparatus 1404). The method may be associated with various advantages at the UE, such as reducing an amount of time to produce/obtain a GNSS fix after a GNSS error recovery in a limited GNSS signal environment. In an example, the method (including the various aspects detailed below) may be performed by the GNSS recovery component 198.

At 1302, the UE obtains an indication of an occurrence of a global navigation satellite system (GNSS) error. For example, FIG. 12 at 1210 shows that the UE 1202 may obtain an indication of an occurrence of a global navigation satellite system (GNSS) error. In an example, FIG. 7 shows that that the GNSS error may be due to the UE 704 being in an urban environment with a limited GNSS signal. In an example, the PE 1014 may detect the GNSS error. In an example, 1302 may be performed by the GNSS recovery component 198.

At 1304, the UE stores, in memory and based on the indication, first position information for the UE that was obtained prior to the obtainment of the indication. For example, FIG. 12 at 1214 shows that the UE 1202 may store, in memory and based on the indication, first position information for the UE 1202 that was obtained prior to the obtainment of the indication at 1210. In an example, the first position information may be the most recent CPI 1020 and the memory may be the memory 1016. In another example, FIG. 10 shows that the PE 1014 may cache a last injected CPI prior to the error recovery. In an example, 1304 may be performed by the GNSS recovery component 198.

At 1306, the UE obtains, subsequent to an error recovery process, second position information for the UE. For example, FIG. 12 at 1218 shows that the UE 1202 may obtain, subsequent to an error recovery process, second position information for the UE 1202. In an example, the second position information may be the post-recovery CPI 1022. In another example, FIG. 11 at 1110 shows that the AP may inject new CPI to the position engine 1104. In an example, 1306 may be performed by the GNSS recovery component 198.

At 1308, the UE accepts or rejects the second position information based on a comparison of the first position information, the second position information, and a set of conditions for the first position information and the second position information. For example, FIG. 12 at 1220 shows that the UE 1202 may accept or reject the second position information based on a comparison of the first position information, the second position information, and a set of conditions for the first position information and the second position information. In an example, FIG. 10 shows that the PE 1014 may perform a proximity check of new CPI with the most recent CPI prior to the error recovery. In another example, FIG. 11 at 1114 shows that the position engine 1104 may determine whether new CPI is the same as or close to prior CPI and FIG. 11 at 1118 and 1116 shows that the position engine 1104 may accept or reject the new CPI based on the determination at 1114. In an example, 1308 may be performed by the GNSS recovery component 198.

In one aspect, the UE may output a second indication of the acceptance or the rejection of the second position information. For example, FIG. 12 at 1222 shows that the UE 1202 may output a second indication of the acceptance or the rejection of the second position information.

In one aspect, outputting the second indication of the acceptance or the rejection of the second position information may include: transmitting the second indication of the acceptance or the rejection of the second position information. For example, outputting the second indication at 1222 may include transmitting the second indication of the acceptance or the rejection of the second position information.

In one aspect, outputting the second indication of the acceptance or the rejection of the second position information may include storing the second indication of the acceptance or the rejection of the second position information. For example, outputting the second indication at 1222 may include storing the second indication of the acceptance or the rejection of the second position information.

In one aspect, the set of conditions for the first position information and the second position information may include at least one of: a difference between the first position information and the second position information being greater than a difference threshold, a position uncertainty level between the first position information and the second position information being greater than a position uncertainty threshold, or a source of the first position information being different from a source of the second position information. For example, the set of conditions referenced at 1220 may include at least one of: a difference between the first position information and the second position information being greater than a difference threshold, a position uncertainty level between the first position information and the second position information being greater than a position uncertainty threshold, or a source of the first position information being different from a source of the second position information. In an example, a source of position information (e.g., the first position information, the second information) may be may be a UE, a base station, a core network (e.g., an LMF of a core network), a WLAN access point, etc.

In one aspect, the UE may compute a position of the UE based on a GNSS measurement. For example, FIG. 12 at 1206 shows that the UE 1202 may compute a position of the UE 1202 based on a GNSS measurement.

In one aspect, the UE may compare the computed position of the UE to a GNSS fix, where the obtainment of the indication of the occurrence of the GNSS error may be based on the comparison. For example, FIG. 12 at 1208 shows that the UE 1202 may compare the computed position of the UE 1202 to a GNSS fix, where the obtainment of the indication of the occurrence of the GNSS error at 1210 may be based on the comparison.

In one aspect, the first position information may be included in a set of position information stored in the memory, and the UE may remove the set of position information except for the first position information from the memory based on the obtainment of the indication. For example, FIG. 12 at 1216 shows that the UE 1202 may remove the set of position information except for the first position information from the memory based on the obtainment of the indication. In an example, the set of position information may include the first assistance information 1018 and the most recent CPI 1020. Furthermore, FIG. 10 shows that the UE 1006 may remove the first assistance information 1018 from the memory 1016 without removing the most recent CPI 1020 from the memory 1016. Additionally, FIG. 11 at 1108 shows that the position engine 1104 may delete all assistance data except a prior CPI.

In one aspect, the first position information may be most-recent position information in the set of position information. For example, the first position information stored at 1214 may be most-recent position information in the set of position information. In another example, FIG. 10 shows that the first position information may be the most recent CPI 1020.

In one aspect, the first position information may include first coarse position information (CPI), and where the second position information includes second CPI. For example, the first position information stored at 1214 and the second position information obtained at 1218 may be first coarse position information and second coarse position information, respectively.

In one aspect, accepting or rejecting the second position information based on the comparison of the first position information, the second position information, and the set of conditions may include: calculating whether a difference between the second position information and the first position information satisfies the set of conditions, where the second position information may be accepted based on the difference satisfying the set of conditions, and where the second position information may be rejected based on the difference not satisfying the set of conditions. For example, accepting or rejecting the second position information based on the comparison of the first position information, the second position information, and the set of conditions at 1220 may include: calculating whether a difference between the second position information and the first position information satisfies the set of conditions, where the second position information may be accepted based on the difference satisfying the set of conditions, and where the second position information may be rejected based on the difference not satisfying the set of conditions.

In one aspect, the second position information may be accepted, and the UE may increase an uncertainty value associated with the second position information. For example, FIG. 12 at 1224 shows that the second position information may be accepted, and that the UE 1202 may increase an uncertainty value associated with the second position information. In another example, FIG. 11 shows that the UE may increase an uncertainty value associated with the second position information when the second position information is accepted.

In one aspect, accepting or rejecting the second position information based on the comparison of the first position information, the second position information, and the set of conditions may occur without performing a GNSS fix. For example, accepting or rejecting the second position information based on the comparison of the first position information, the second position information, and the set of conditions at 1220 may occur without performing a GNSS fix.

In one aspect, the UE may generate, subsequent to the acceptance of the second position information, satellite acquisition assistance information based on the second position information. For example, FIG. 12 at 1226 shows that the UE 1202 may generate, subsequent to the acceptance of the second position information, satellite acquisition assistance information based on the second position information.

In one aspect, the UE may obtain a GNSS fix based on the satellite acquisition assistance information. For example, FIG. 12 at 1228 shows that the UE may obtain a GNSS fix based on the satellite acquisition assistance information.

In one aspect, the UE may initiate the error recovery process based on the obtainment of the indication, where the obtainment of the second position information may occur after a conclusion of the error recovery process. For example, FIG. 12 at 1212 shows that the UE 1202 may initiate the error recovery process based on the obtainment of the indication, where the obtainment of the second position information at 1218 may occur after a conclusion of the error recovery process.

In one aspect, the UE may obtain, subsequent to the rejection of the second position information, third position information for the UE. For example, FIG. 12 at 1230 shows that the UE 1202 may obtain, subsequent to the rejection of the second position information, third position information for the UE 1202.

In one aspect, the UE may accept or reject the third position information based on a second comparison of the first position information, the third position information, and a second set of conditions for the first position information and the third position information. For example, FIG. 12 at 1232 shows that the UE 1202 may accept or reject the third position information based on a second comparison of the first position information, the third position information, and a second set of conditions for the first position information and the third position information.

In one aspect, the second set of conditions for the first position information and the third position information may include at least one of: a difference between the first position information and the third position information being greater than a difference threshold; a position uncertainty level between the first position information and the third position information being greater than a position uncertainty threshold; or a source of the first position information being different from a source of the third position information. For example, the second set of conditions referenced at 1232 may include at least one of: a difference between the first position information and the third position information being greater than a difference threshold; a position uncertainty level between the first position information and the third position information being greater than a position uncertainty threshold; or a source of the first position information being different from a source of the third position information. In an example, a source of position information (e.g., the first position information, the third information) may be may be a UE, a base station, a core network (e.g., an LMF of a core network), a WLAN access point, etc.

In one aspect, the UE may obtain, subsequent to the rejection of the second position information, a GNSS fix. For example, FIG. 12 at 1234 shows that the UE 1202 may obtain, subsequent to the rejection of the second position information, a GNSS fix.

In one aspect, the second position information may include multiple instances of position information for the UE each corresponding to subsequent time instances, where each of the multiple instances of the position information may be rejected based on comparisons between the first position information and the multiple instances of the position information, and the UE may cease to obtain a next instance of position information for the UE based on the obtainment of the GNSS fix. For example, FIG. 12 at 1236 shows that the second position information may include multiple instances of position information for the UE 1202 each corresponding to subsequent time instances, where each of the multiple instances of the position information may be rejected based on comparisons between the first position information and the multiple instances of the position information, and the UE 1202 may cease to obtain a next instance of position information for the UE 1202 based on the obtainment of the GNSS fix at 1234.

Figure 14:
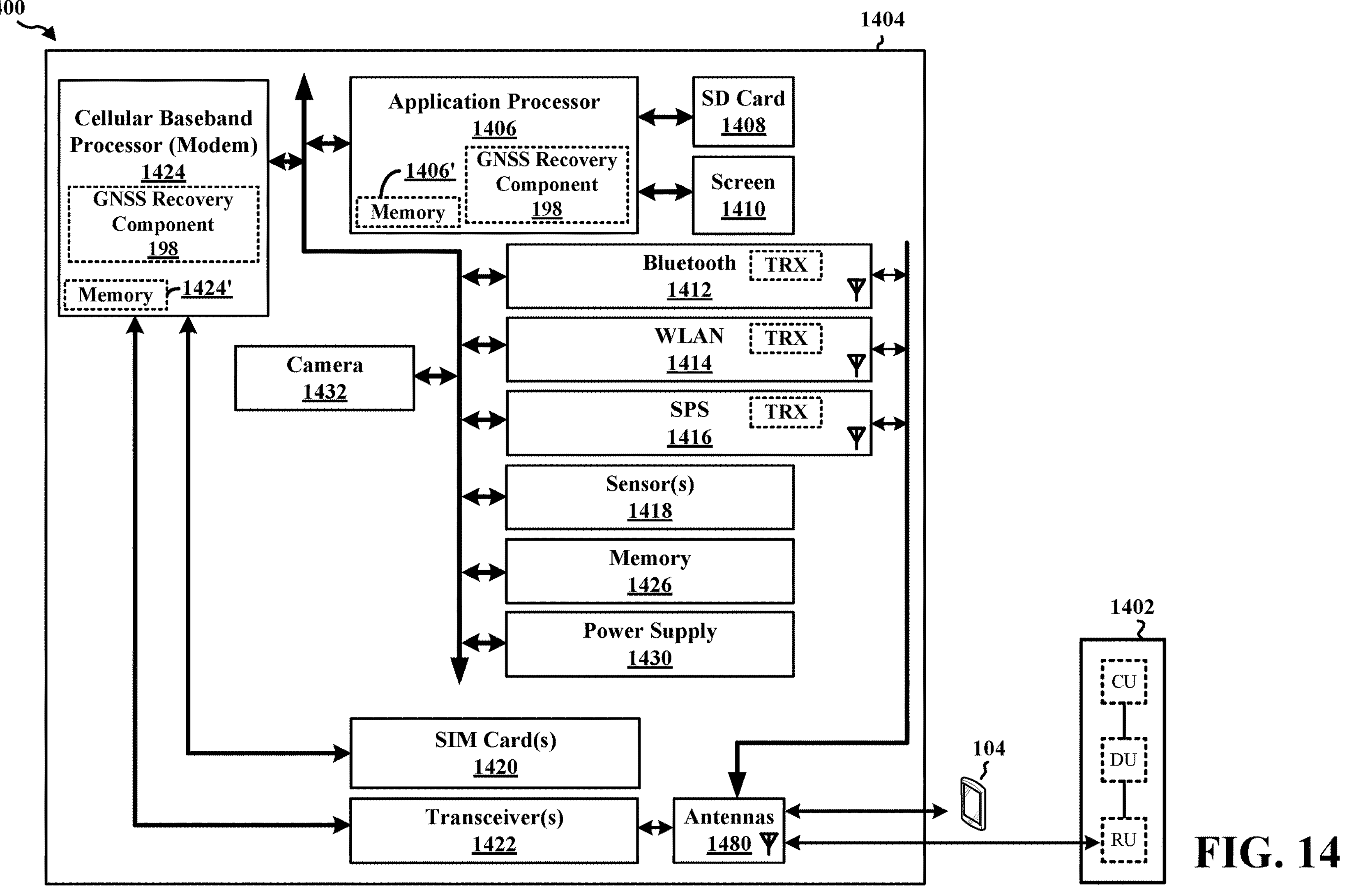
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the GNSS recovery component 198 may be configured to obtain an indication of an occurrence of a global navigation satellite system (GNSS) error. The GNSS recovery component 198 may be configured to store, in memory and based on the indication, first position information for the UE that was obtained prior to the obtainment of the indication. The GNSS recovery component 198 may be configured to obtain, subsequent to an error recovery process, second position information for the UE. The GNSS recovery component 198 may be configured to accept or reject the second position information based on a comparison of the first position information, the second position information, and a set of conditions for the first position information and the second position information. The GNSS recovery component 198 may be configured to output a second indication of the acceptance or the rejection of the second position information. The GNSS recovery component 198 may be configured to compute a position of the UE based on a GNSS measurement. The GNSS recovery component 198 may be configured to compare the computed position of the UE to a GNSS fix, where the obtainment of the indication of the occurrence of the GNSS error is based on the comparison. The GNSS recovery component 198 may be configured to remove the set of position information except for the first position information from the memory based on the obtainment of the indication. The GNSS recovery component 198 may be configured to increase an uncertainty value associated with the second position information. The GNSS recovery component 198 may be configured to generate, subsequent to the acceptance of the second position information, satellite acquisition assistance information based on the second position information. The GNSS recovery component 198 may be configured to obtain a GNSS fix based on the satellite acquisition assistance information. The GNSS recovery component 198 may be configured to initiate the error recovery process based on the obtainment of the indication, where the obtainment of the second position information occurs after a conclusion of the error recovery process. The GNSS recovery component 198 may be configured to obtain, subsequent to the rejection of the second position information, third position information for the UE. The GNSS recovery component 198 may be configured to accept or reject the third position information based on a second comparison of the first position information, the third position information, and a second set of conditions for the first position information and the third position information. The GNSS recovery component 198 may be configured to obtain, subsequent to the rejection of the second position information, a GNSS fix. The GNSS recovery component 198 may be configured to cease to obtain a next instance of position information for the UE based on the obtainment of the GNSS fix. The GNSS recovery component 198 may be within the cellular baseband processor(s) 1424, the application processor(s) 1406, or both the cellular baseband processor(s) 1424 and the application processor(s) 1406. The GNSS recovery component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for obtaining an indication of an occurrence of a global navigation satellite system (GNSS) error. In one configuration, the apparatus 1404, and in particular the cellular baseband processor(s) 1424 and/or the application processor(s) 1406, may include means for storing, in memory and based on the indication, first position information for the UE that was obtained prior to the obtainment of the indication. In one configuration, the apparatus 1404, and in particular the cellular baseband processor(s) 1424 and/or the application processor(s) 1406, may include means for obtaining, subsequent to an error recovery process, second position information for the UE. In one configuration, the apparatus 1404, and in particular the cellular baseband processor(s) 1424 and/or the application processor(s) 1406, may include means for accepting or rejecting the second position information based on a comparison of the first position information, the second position information, and a set of conditions for the first position information and the second position information. In one configuration, the apparatus 1404, and in particular the cellular baseband processor(s) 1424 and/or the application processor(s) 1406, may include means for outputting a second indication of the acceptance or the rejection of the second position information. In one configuration, the apparatus 1404, and in particular the cellular baseband processor(s) 1424 and/or the application processor(s) 1406, may include means for computing a position of the UE based on a GNSS measurement. In one configuration, the apparatus 1404, and in particular the cellular baseband processor(s) 1424 and/or the application processor(s) 1406, may include means for comparing the computed position of the UE to a GNSS fix, where the obtainment of the indication of the occurrence of the GNSS error is based on the comparison. In one configuration, the apparatus 1404, and in particular the cellular baseband processor(s) 1424 and/or the application processor(s) 1406, may include means for removing the set of position information except for the first position information from the memory based on the obtainment of the indication. In one configuration, the apparatus 1404, and in particular the cellular baseband processor(s) 1424 and/or the application processor(s) 1406, may include means for increasing an uncertainty value associated with the second position information. In one configuration, the apparatus 1404, and in particular the cellular baseband processor(s) 1424 and/or the application processor(s) 1406, may include means for generating, subsequent to the acceptance of the second position information, satellite acquisition assistance information based on the second position information. In one configuration, the apparatus 1404, and in particular the cellular baseband processor(s) 1424 and/or the application processor(s) 1406, may include means for obtaining a GNSS fix based on the satellite acquisition assistance information. In one configuration, the apparatus 1404, and in particular the cellular baseband processor(s) 1424 and/or the application processor(s) 1406, may include means for initiating the error recovery process based on the obtainment of the indication, where the obtainment of the second position information occurs after a conclusion of the error recovery process. In one configuration, the apparatus 1404, and in particular the cellular baseband processor(s) 1424 and/or the application processor(s) 1406, may include means for obtaining, subsequent to the rejection of the second position information, third position information for the UE. In one configuration, the apparatus 1404, and in particular the cellular baseband processor(s) 1424 and/or the application processor(s) 1406, may include means for accepting or rejecting the third position information based on a second comparison of the first position information, the third position information, and a second set of conditions for the first position information and the third position information. In one configuration, the apparatus 1404, and in particular the cellular baseband processor(s) 1424 and/or the application processor(s) 1406, may include means for obtaining, subsequent to the rejection of the second position information, a GNSS fix. In one configuration, the apparatus 1404, and in particular the cellular baseband processor(s) 1424 and/or the application processor(s) 1406, may include means for ceasing to obtain a next instance of position information for the UE based on the obtainment of the GNSS fix. The means may be the GNSS recovery component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

As noted above, a UE may utilize a GNSS system in order to determine a position of the UE (i.e., produce/obtain a GNSS fix). For instance, the UE may perform measurements on signals transmitted by satellites(s) and the UE may compute its position based on the measurements. Furthermore, the UE may also utilize assistance information in addition to the measurements in order to determine the position of the UE in a more rapid manner, where the assistance information may be obtained/produced by the UE periodically and stored in memory of the UE. In an example, the assistance information may include timing information of the UE, coarse position information of the UE, and satellite acquisition information. In some scenarios, a GNSS error may occur/be detected, where the GNSS error may be caused by the UE being unable to obtain a GNSS fix. Upon detecting the GNSS error, the UE may perform an error recovery process. As part of the error recovery process, the UE may delete the assistance information from the memory. The UE may then perform a blind search for satellite(s) without using assistance information in order to obtain a GNSS fix. After the UE has obtained the GNSS fix, the UE may obtain new assistance information. However, obtaining a GNSS fix without assistance information may take a relatively long amount of time and/or may take a relatively large amount of computational resources of the UE, which may affect user experience.

Various technologies pertaining to improving a time to produce a GNSS fix after an error recovery in a limited GNSS signal environment are described herein. In an example, a UE obtains an indication of an occurrence of a global navigation satellite system (GNSS) error. The UE stores, in memory and based on the indication, first position information for the UE that was obtained prior to the obtainment of the indication. The UE obtains, subsequent to an error recovery process, second position information for the UE. The UE accepts or rejects the second position information based on a comparison of the first position information, the second position information, and a set of conditions for the first position information and the second position information. Vis-à-vis storing the first position information (i.e., most recent position information) in the memory (as opposed to deleting the first position information) and accepting the second position information based on the comparison of the first position information, the second position information, and the set of conditions, the UE may be able to obtain a GNSS fix in a more rapid manner compared to a UE that deletes all assistance information as part of an error recovery process. Furthermore, by the comparison of the first position information, the second position information, and the set of conditions, the UE may accept the second position information with a reasonable amount of certainty that the second position information is not erroneous. Thus, the aforementioned technologies may improve user experience and/or conserve computational resources.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean “one and only one” unless specifically so stated, but rather “one or more.” Terms such as “if,” “when,” and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C. B and C, or A and B and C, where any such combinations may contain one or more member or members of A, B, or C. Sets should be interpreted as a set of elements where the elements number one or more. Accordingly, for a set of X. X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: obtaining an indication of an occurrence of a global navigation satellite system (GNSS) error; storing, in memory and based on the indication, first position information for the UE that was obtained prior to the obtainment of the indication; obtaining, subsequent to an error recovery process, second position information for the UE; and accepting or rejecting the second position information based on a comparison of the first position information, the second position information, and a set of conditions for the first position information and the second position information.

Aspect 2 is the method of aspect 1, further comprising: outputting a second indication of the acceptance or the rejection of the second position information.

Aspect 3 is the method of aspect 2, wherein outputting the second indication of the acceptance or the rejection of the second position information includes: transmitting the second indication of the acceptance or the rejection of the second position information; or storing the second indication of the acceptance or the rejection of the second position information.

Aspect 4 is the method of any of aspects 1-3, wherein the set of conditions for the first position information and the second position information includes at least one of: a difference between the first position information and the second position information being greater than a difference threshold, a position uncertainty level between the first position information and the second position information being greater than a position uncertainty threshold, or a source of the first position information being different from a source of the second position information.

Aspect 5 is the method of any of aspects 1-4, further comprising: computing a position of the UE based on a GNSS measurement; and comparing the computed position of the UE to a GNSS fix, wherein the obtainment of the indication of the occurrence of the GNSS error is based on the comparison.

Aspect 6 is the method of any of aspects 1-5, wherein the first position information is included in a set of position information stored in the memory, the method further comprising: removing the set of position information except for the first position information from the memory based on the obtainment of the indication.

Aspect 7 is the method of aspect 6, wherein the first position information is most-recent position information in the set of position information.

Aspect 8 is the method of any of aspects 1-7, wherein the first position information includes first coarse position information (CPI), and wherein the second position information includes second CPI.

Aspect 9 is the method of any of aspects 1-8, wherein accepting or rejecting the second position information based on the comparison of the first position information, the second position information, and the set of conditions includes: calculating whether a difference between the second position information and the first position information satisfies the set of conditions, wherein the second position information is accepted based on the difference satisfying the set of conditions, and wherein the second position information is rejected based on the difference not satisfying the set of conditions.

Aspect 10 is the method of any of aspects 1-9, wherein the second position information is accepted, the method further comprising: increasing an uncertainty value associated with the second position information.

Aspect 11 is the method of any of aspects 1-10, wherein accepting or rejecting the second position information based on the comparison of the first position information, the second position information, and the set of conditions occurs without performing a GNSS fix.

Aspect 12 is the method of any of aspects 1-11, further comprising: generating, subsequent to the acceptance of the second position information, satellite acquisition assistance information based on the second position information; and obtaining a GNSS fix based on the satellite acquisition assistance information.

Aspect 13 is the method of any of aspects 1-12, further comprising: initiating the error recovery process based on the obtainment of the indication, wherein the obtainment of the second position information occurs after a conclusion of the error recovery process.

Aspect 14 is the method of any of aspects 1-9 or 11-13, further comprising: obtaining, subsequent to the rejection of the second position information, third position information for the UE; and accepting or rejecting the third position information based on a second comparison of the first position information, the third position information, and a second set of conditions for the first position information and the third position information.

Aspect 15 is the method of aspect 14, wherein the second set of conditions for the first position information and the third position information includes at least one of: a difference between the first position information and the third position information being greater than a difference threshold; a position uncertainty level between the first position information and the third position information being greater than a position uncertainty threshold; or a source of the first position information being different from a source of the third position information.

Aspect 16 is the method of any of aspects 1-10 or 12-15, further comprising: obtaining, subsequent to the rejection of the second position information, a GNSS fix.

Aspect 17 is the method of aspect 16, wherein the second position information includes multiple instances of position information for the UE each corresponding to subsequent time instances, wherein each of the multiple instances of the position information is rejected based on comparisons between the first position information and the multiple instances of the position information, the method further comprising: ceasing to obtain a next instance of position information for the UE based on the obtainment of the GNSS fix.

Aspect 18 is an apparatus for wireless communication at a user equipment (UE), comprising at least one memory and at least one processor coupled to the at least one memory and, based at least in part on information stored in the at least one memory, the at least one processor, individually or in any combination, is configured to perform a method as in any of aspects 1-17.

Aspect 19 is the apparatus of aspect 18, further comprising at least one of a transceiver or an antenna coupled to the at least one processor, wherein to obtain the indication of the occurrence of the GNSS error, the at least one processor, individually or in any combination, is configured to obtain the indication of the occurrence of the GNSS via at least one of the transceiver or the antenna.

Aspect 20 is an apparatus for a wireless communication at a user equipment (UE), comprising means for performing the method as in any of aspects 1-17.

Aspect 21 is a computer-readable medium (e.g., a non-transitory computer-readable medium) storing computer executable code at a user equipment (UE), the computer executable code, when executed by at least one processor, causes the at least one processor to perform a method as in any of aspects 1-17.

What is claimed is:

1. An apparatus for wireless communication at a user equipment (UE), comprising:

at least one memory;

a global navigation satellite system (GNSS) receiver; and at least one processor coupled to the at least one memory and, based at least in part on information stored in the at least one memory, the at least one processor is configured to:

obtain an indication of an occurrence of a global navigation satellite system (GNSS) error;

search for a satellite vehicle via the GNSS receiver based on the occurrence of the GNSS error;

store, in the at least one memory and based on the indication, first position information for the UE that was obtained prior to the obtainment of the indication;

obtain, from the satellite vehicle via the GNSS receiver subsequent to an error recovery process, second position information for the UE based on a periodicity; and accept or reject, based on the periodicity, the second position information based on a comparison of the first position information, the second position information, and a set of conditions for the first position information and the second position information, wherein the at least one processor is configured to reject the second position information based on a difference between the first position information and the second position information being less than a difference threshold.

2. The apparatus of claim 1, wherein the at least one processor is further configured to:

output a second indication of the acceptance or the rejection of the second position information.

3. The apparatus of claim 2, wherein to output the second indication of the acceptance or the rejection of the second position information, the at least one processor is configured to:

transmit the second indication of the acceptance or the rejection of the second position information; or store the second indication of the acceptance or the rejection of the second position information.

4. The apparatus of claim 1, wherein the set of conditions for the first position information and the second position information includes at least one of:

a difference between the first position information and the second position information being greater than the difference threshold, a position uncertainty level between the first position information and the second position information being greater than a position uncertainty threshold, or a source of the first position information being different from a source of the second position information.

5. The apparatus of claim 1, wherein the at least one processor is further configured to:

compute a position of the UE based on a GNSS measurement; and compare the computed position of the UE to a GNSS fix, wherein the obtainment of the indication of the occurrence of the GNSS error is based on the comparison.

6. The apparatus of claim 1, wherein the first position information is included in a set of position information stored in the memory, and wherein the at least one processor is further configured to:

remove the set of position information except for the first position information from the at least one memory based on the obtainment of the indication.

7. The apparatus of claim 6, wherein the first position information is most-recent position information in the set of position information.

8. The apparatus of claim 1, wherein the first position information comprises first coarse position information (CPI), and wherein the second position information comprises second CPI.

9. The apparatus of claim 1, wherein to accept or reject the second position information based on the comparison of the first position information, the second position information, and the set of conditions, the at least one processor is configured to:

calculate whether a difference between the second position information and the first position information satisfies the set of conditions, wherein to accept the second position information, the at least one processor is configured to accept the second position information based on the difference satisfying the set of conditions, and wherein to reject the second position information, the at least one processor is configured to reject the second position information based on the difference not satisfying the set of conditions.

10. The apparatus of claim 1, wherein the second position information is accepted, and wherein the at least one processor is further configured to:

increase an uncertainty value associated with the second position information.

11. The apparatus of claim 1, wherein to accept or reject the second position information based on the comparison of the first position information, the second position information, and the set of conditions, the at least one processor is configured to accept or reject the second position information without performing a GNSS fix.

12. The apparatus of claim 1, wherein the at least one processor is further configured to:

generate, subsequent to the acceptance of the second position information, satellite acquisition assistance information based on the second position information; and obtain a GNSS fix based on the satellite acquisition assistance information.

13. The apparatus of claim 1, wherein the at least one processor is further configured to:

initiate the error recovery process based on the obtainment of the indication, wherein to obtain the second position information, the at least one processor is configured to obtain the second position information after a conclusion of the error recovery process.

14. The apparatus of claim 1, wherein the at least one processor is further configured to:

obtain, subsequent to the rejection of the second position information, third position information for the UE; and accept or reject the third position information based on a second comparison of the first position information, the third position information, and a second set of conditions for the first position information and the third position information.

15. The apparatus of claim 14, wherein the second set of conditions for the first position information and the third position information includes at least one of:

a difference between the first position information and the third position information being greater than the difference threshold;

a position uncertainty level between the first position information and the third position information being greater than a position uncertainty threshold; or a source of the first position information being different from a source of the third position information.

16. The apparatus of claim 1, wherein the at least one processor is further configured to:

obtain, subsequent to the rejection of the second position information, a GNSS fix.

17. The apparatus of claim 16, wherein the second position information comprises multiple instances of position information for the UE each corresponding to subsequent time instances, wherein each of the multiple instances of the position information is rejected based on comparisons between the first position information and the multiple instances of the position information, and wherein the at least one processor is further configured to:

cease to obtain a next instance of position information for the UE based on the obtainment of the GNSS fix.

18. The apparatus of claim 1, further comprising at least one of a transceiver or an antenna coupled to the at least one processor, wherein to obtain the indication of the occurrence of the GNSS error, the at least one processor is configured to obtain the indication of the occurrence of the GNSS via at least one of the transceiver or the antenna.

19. A method of wireless communication at a user equipment (UE), comprising:

obtaining an indication of an occurrence of a global navigation satellite system (GNSS) error;

searching for a satellite vehicle via a GNSS receiver based on the occurrence of the GNSS error;

storing, in memory and based on the indication, first position information for the UE that was obtained prior to the obtainment of the indication;

obtaining, from the satellite vehicle via the GNSS receiver subsequent to an error recovery process, second position information for the UE based on a periodicity; and accepting or rejecting, based on the periodicity, the second position information based on a comparison of the first position information, the second position information, and a set of conditions for the first position information and the second position information, wherein rejecting the second position information is based on a difference between the first position information and the second position information being less than a difference threshold.

20. The method of claim 19, further comprising:

outputting a second indication of the acceptance or the rejection of the second position information.

21. The method of claim 20, wherein outputting the second indication of the acceptance or the rejection of the second position information comprises:

transmitting the second indication of the acceptance or the rejection of the second position information; or storing the second indication of the acceptance or the rejection of the second position information.

22. The method of claim 19, wherein the set of conditions for the first position information and the second position information includes at least one of:

a difference between the first position information and the second position information being greater than the difference threshold, a position uncertainty level between the first position information and the second position information being greater than a position uncertainty threshold, or a source of the first position information being different from a source of the second position information.

23. The method of claim 19, further comprising:

computing a position of the UE based on a GNSS measurement; and comparing the computed position of the UE to a GNSS fix, wherein the obtainment of the indication of the occurrence of the GNSS error is based on the comparison.

24. The method of claim 19, wherein the first position information is included in a set of position information stored in the memory, the method further comprising:

removing the set of position information except for the first position information from the memory based on the obtainment of the indication.

25. The method of claim 24, wherein the first position information is most-recent position information in the set of position information.

26. The method of claim 19, wherein the first position information comprises first coarse position information (CPI), and wherein the second position information comprises second CPI.

27. The method of claim 19, wherein accepting or rejecting the second position information based on the comparison of the first position information, the second position information, and the set of conditions comprises:

calculating whether a difference between the second position information and the first position information satisfies the set of conditions, wherein the second position information is accepted based on the difference satisfying the set of conditions, and wherein the second position information is rejected based on the difference not satisfying the set of conditions.

28. The method of claim 19, wherein the second position information is accepted, the method further comprising:

increasing an uncertainty value associated with the second position information.

29. An apparatus for wireless communication at a user equipment (UE), comprising:

means for obtaining an indication of an occurrence of a global navigation satellite system (GNSS) error;

means for searching for a satellite vehicle via a GNSS receiver based on the occurrence of the GNSS error;

means for storing, in memory and based on the indication, first position information for the UE that was obtained prior to the obtainment of the indication;

means for obtaining, from the satellite vehicle via the GNSS receiver subsequent to an error recovery process, second position information for the UE based on a periodicity; and means for accepting or rejecting, based on the periodicity, the second position information based on a comparison of the first position information, the second position information, and a set of conditions for the first position information and the second position information, wherein rejecting the second position information is based on a difference between the first position information and the second position information being less than a difference threshold.

30. A non-transitory computer-readable medium storing computer executable code at a user equipment (UE), the computer executable code, when executed by at least one processor, causes the at least one processor to:

obtain an indication of an occurrence of a global navigation satellite system (GNSS) error;

search for a satellite vehicle via a GNSS receiver based on the occurrence of the GNSS error;

store, in memory and based on the indication, first position information for the UE that was obtained prior to the obtainment of the indication;

obtain, from the satellite vehicle via the GNSS receiver subsequent to an error recovery process, second position information for the UE based on a periodicity; and accept or reject, based on the periodicity, the second position information based on a comparison of the first position information, the second position information, and a set of conditions for the first position information and the second position information, wherein the computer executable code, when executed by the at least one processor, causes the at least one processor to reject the second position information based on a difference between the first position information and the second position information being less than a difference threshold.

* * * * *